US012568442B2

(12) United States Patent
Wernersson et al.

(10) Patent No.: US 12,568,442 B2
(45) Date of Patent: Mar. 3, 2026

(54) METHODS AND APPARATUS FOR UPLINK POWER CONTROL

(71) Applicant: Telefonaktiebolaget LM Ericsson (publ), Stockholm (SE)

(72) Inventors: Niklas Wernersson, Kungsängen (SE); Pål Frenger, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 300 days.

(21) Appl. No.: 18/560,563

(22) PCT Filed: May 18, 2021

(86) PCT No.: PCT/SE2021/050470
§ 371 (c)(1),
(2) Date: Nov. 13, 2023

(87) PCT Pub. No.: WO2022/245260
PCT Pub. Date: Nov. 24, 2022

(65) Prior Publication Data
US 2024/0259953 A1     Aug. 1, 2024

(51) Int. Cl.
*H04W 52/14* (2009.01)
*H04W 52/24* (2009.01)
*H04W 52/36* (2009.01)

(52) U.S. Cl.
CPC ....... *H04W 52/146* (2013.01); *H04W 52/242* (2013.01); *H04W 52/365* (2013.01); *H04W 52/367* (2013.01)

(58) Field of Classification Search
CPC ............. H04W 52/146; H04W 52/242; H04W 52/365; H04W 52/367; H04W 52/325; H04W 52/346
(Continued)

(56) References Cited

U.S. PATENT DOCUMENTS 10,897,740 B1 * 1/2021 He ...................... H04W 52/242
11,576,060 B2 * 2/2023 Manolakos .......... H04B 7/0695
(Continued)

FOREIGN PATENT DOCUMENTS

WO   WO-2010085185 A1 * 7/2010 ........... H04B 17/391
WO   WO-2012153984 A2 * 11/2012 ............ H04W 52/40
WO   WO-2013025562 A2 * 2/2013 ........... H04W 52/281

OTHER PUBLICATIONS

International Search Report and Written Opinion dated Feb. 16, 2022 for International Application No. PCT/SE2021/050470 filed May 18, 2021, consisting of 15-pages.
(Continued)

*Primary Examiner* — Mahendra R Patel
(74) *Attorney, Agent, or Firm* — Weisberg I.P. Law, P.A.

(57) ABSTRACT

The disclosure relates to methods for determining a transmission power level for a physical uplink channel of a wireless communication network. A method performed by a UE includes receiving information from a network node, the information being related to a configuration of multiple transmission points used for downlink transmissions to the wireless device. The method further includes receiving signals from the multiple transmission points based on the information; estimating a pathloss value for each of at least two transmission points among the multiple transmission points based on the received signals; determining a single value based on a function of the estimated pathloss values; and determining the transmission power level based on the single value.

20 Claims, 9 Drawing Sheets

(58) Field of Classification Search
USPC ......................................................... 370/318
See application file for complete search history.

(56)                         References Cited

U.S. PATENT DOCUMENTS

| | | | |
|---|---|---|---|
| 2011/0281525 A1* | 11/2011 | Furuskar ............. | H04B 17/309 |
| | | | 455/67.11 |
| 2013/0142113 A1* | 6/2013 | Fong ................... | H04L 27/2646 |
| | | | 370/328 |
| 2016/0112961 A1* | 4/2016 | Zhang ................ | H04W 52/242 |
| | | | 455/522 |
| 2020/0229106 A1* | 7/2020 | Nguyen ............. | H04W 52/245 |
| 2020/0396691 A1* | 12/2020 | Wernersson .......... | H04W 24/10 |
| 2021/0219244 A1* | 7/2021 | Wernersson ........ | H04W 52/325 |

OTHER PUBLICATIONS

3GPP TS 38.213 V15.11.0; 3rd Generation Partnership Project; Technical Specification Group Radio Access Network; NR; Physical layer procedures for control (Release 15); Sep. 2020, consisting of 109-pages.
G. Interdonato et al.; Ubiquitous cell-free Massive MIMO communications; EURASIP Journal on Wireless Communications and Networking; 2019, consisting of 13-pages.

* cited by examiner

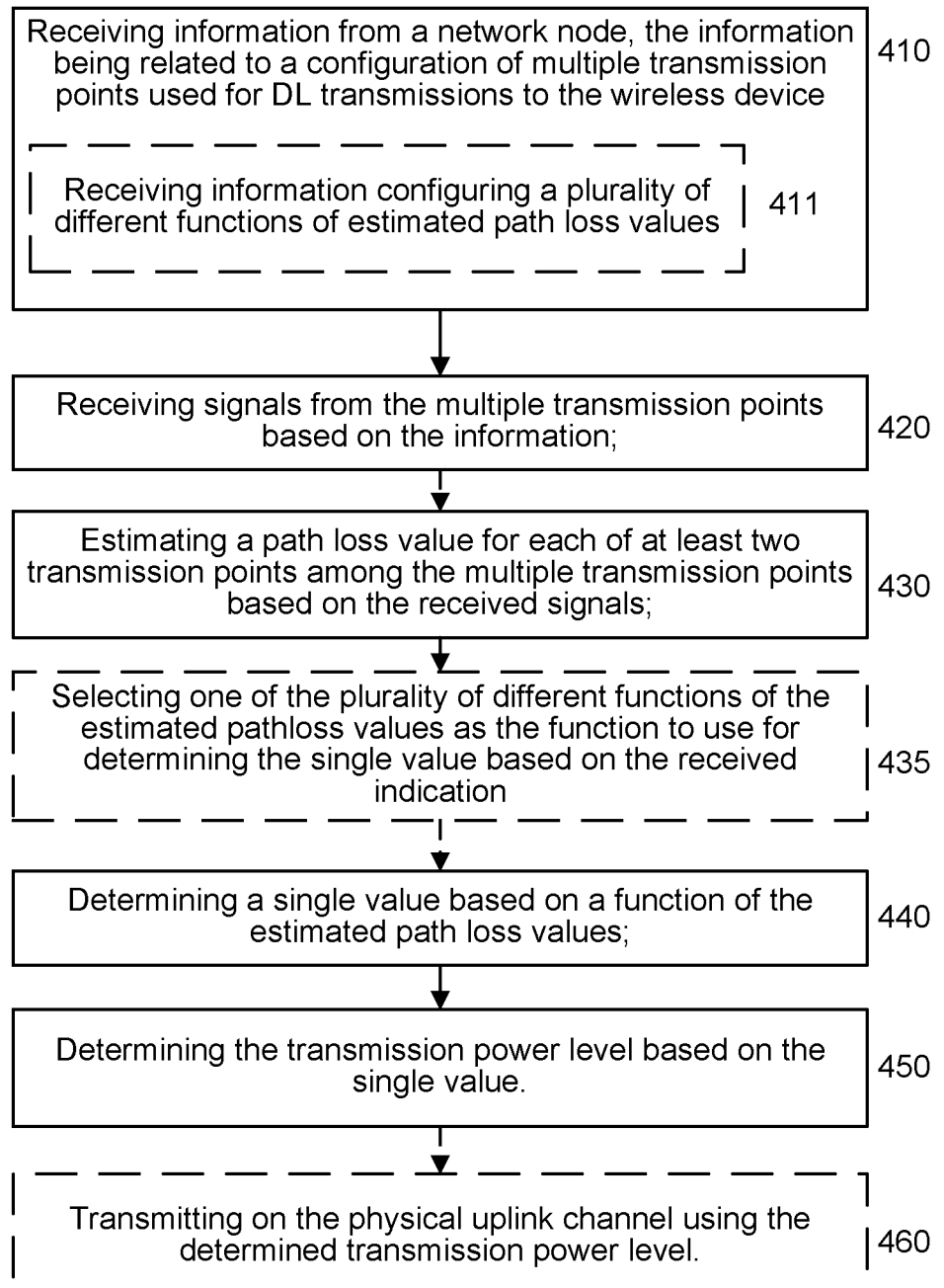

Receiving information from a network node, the information being related to a configuration of multiple transmission points used for DL transmissions to the wireless device — 410

Receiving information configuring a plurality of different functions of estimated path loss values — 411

Receiving signals from the multiple transmission points based on the information; — 420

Estimating a path loss value for each of at least two transmission points among the multiple transmission points based on the received signals; — 430

Selecting one of the plurality of different functions of the estimated pathloss values as the function to use for determining the single value based on the received indication — 435

Determining a single value based on a function of the estimated path loss values; — 440

Determining the transmission power level based on the single value. — 450

Transmitting on the physical uplink channel using the determined transmission power level. — 460

*FIG. 4*

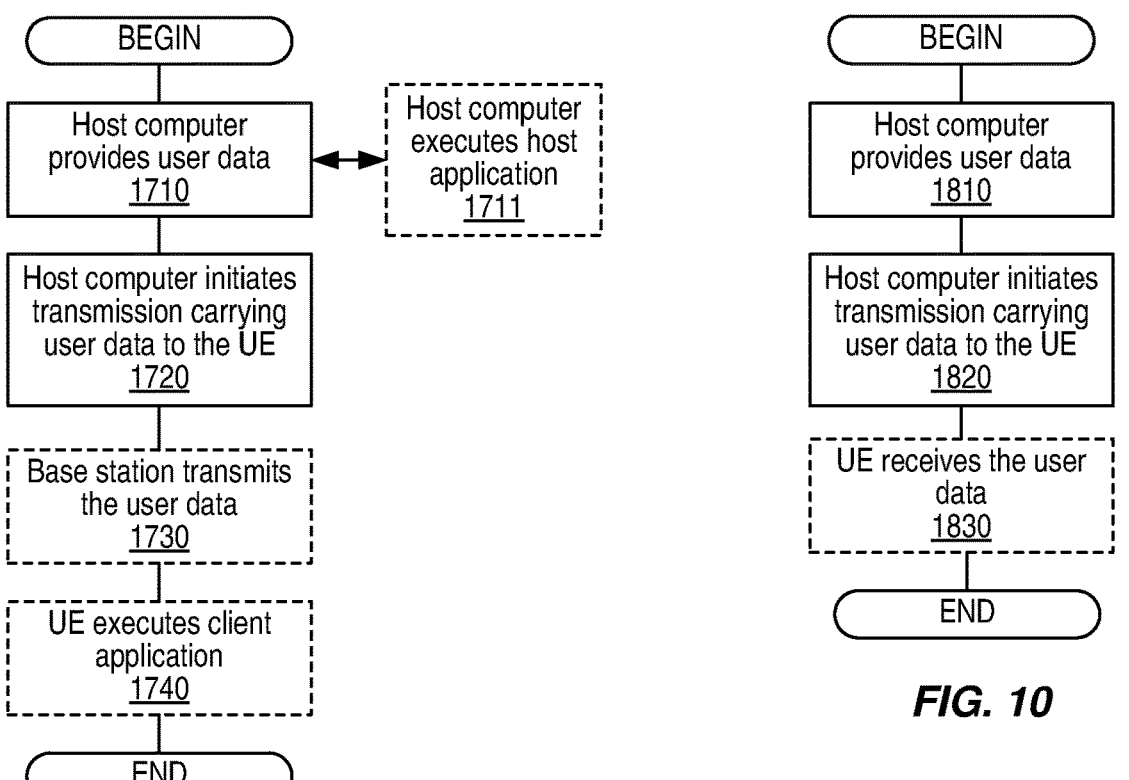

BEGIN

Host computer provides user data
1710

Host computer executes host application
1711

Host computer initiates transmission carrying user data to the UE
1720

Base station transmits the user data
1730

UE executes client application
1740

END

FIG. 9

BEGIN

Host computer provides user data
1810

Host computer initiates transmission carrying user data to the UE
1820

UE receives the user data
1830

END

FIG. 10

BEGIN

UE receives input data provided at host computer
1910

UE executes client application
1911

UE provides user data
1920

UE executes client application
1921

UE initiates transmission of user data to host computer
1930

Host computer receives user data transmitted from the UE
1940

END

FIG. 11

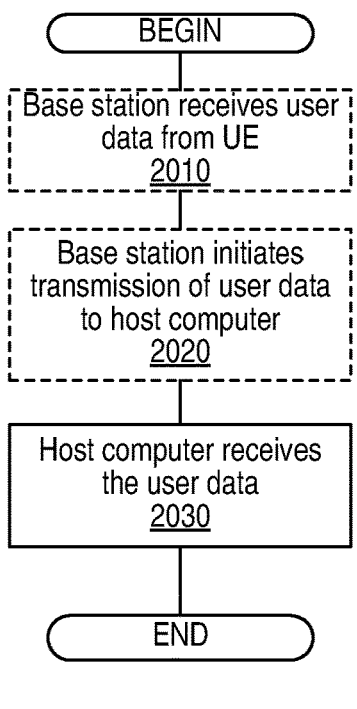

BEGIN

Base station receives user data from UE
2010

Base station initiates transmission of user data to host computer
2020

Host computer receives the user data
2030

END

FIG. 12

METHODS AND APPARATUS FOR UPLINK POWER CONTROL

CROSS-REFERENCE TO RELATED APPLICATION

This application is a Submission Under 35 U.S.C. § 371 for U.S. National Stage Patent Application of International Application Number: PCT/SE2021/050470, filed May 18, 2021 entitled "METHODS AND APPARATUS FOR UPLINK POWER CONTROL," the entirety of which is incorporated herein by reference.

TECHNICAL FIELD

The present disclosure relates to methods for determining a transmission power level for a physical uplink channel in a wireless communication network.

BACKGROUND

Uplink Power Control

Setting output power levels of transmitting points, radio network nodes or base stations in downlink (DL) and wireless devices or User Equipment (UE) in uplink (UL), in mobile systems or wireless communication networks is commonly referred to as power control (PC). Objectives of PC include improved capacity, coverage, and system robustness, and reduced power consumption.

In a new radio, NR, or fifth generation (5G) radio access network, RAN, context, UL PC mechanisms can be categorized into the groups (i) open-loop, (ii) closed-loop, and (iii) combined open- and closed loop. These differ in what input is used to determine the transmit power level. In the open-loop case, the transmitter measures some signal sent from the receiver, and sets its output power based on this. In the closed-loop case, the receiver measures the signal from the transmitter, and based on this sends a Transmit Power Control (TPC) command to the transmitter, which then sets the transmit power accordingly. In a combined open- and closed-loop scheme, both open-loop and closed-loop methods are used to set the transmit power. LTE UL PC is very similar to NR UL PC.

In NR release 15, as described in TR 38.213 v15.11.0, the UE is performing PC for physical random-access channel (PRACH) transmission. The UE determines a transmission power for PRACH, $P_{PRACH,b,f,c}(i)$, on active UL bandwidth part (BWP) b of carrier f of serving cell c based on DL reference signal for serving cell c in transmission occasion i as:

$$P_{PRACH,b,f,c}(i) = \min\{P_{CMAX,f,c}(i), P_{PRACH,target,f,c} + PL_{b,f,c}\}[\text{dBm}] \quad [\text{eq. 1}]$$

$P_{CMAx,f,c}(i)$ is the UE configured maximum output power. $P_{PRACH,target,f,c}$ is the PRACH target reception power provided by higher layers for the active UL BWP b of carrier of serving cell C, and $PL_{b,f,c}$ is a pathloss for the active UL BWP.

After a connection is established between the UE and the gNodeB (gNB) the UE can be configured for performing UL PC also for physical uplink control channel (PUCCH), Physical Uplink Shared Channel (PUSCH) and Sounding Reference Signal (SRS) transmission.

When a UE transmits a PUSCH on active UL BWP b of carrier f of serving cell c using parameter set configuration with index j and PUSCH power control adjustment state with index l, the UE determines the PUSCH transmission power $P_{PUSCH,b,f,c}(i, j, q_d, l)$ in PUSCH transmission occasion i as:

$$
P_{PUSCH,b,f,c}(i, j, q_d, l) = \quad [\text{eq. 2}]
$$

$$
\min\left\{
\begin{array}{l}
P_{CMAX,f,c}(i), \\
P_{O\_PUSCH,b,f,c}(j) + 10\log_{10}\left(2^{\mu} \cdot M_{RB,b,f,c}^{PUSCH}(i)\right) + \alpha_{b,f,c}(j) \cdot \\
\quad PL_{b,f,c}(q_d) + \Delta_{TF,b,f,c}(i) + f_{b,f,c}(i, l)
\end{array}
\right\}[\text{dBm}]
$$

$M_{RB,b,f,c}^{PUSCH}(i)$ is a bandwidth of the PUSCH resource assignment expressed in number of resource blocks. $PL_{b,f,c}(q_d)$ is a downlink pathloss estimate in dB calculated by the UE using reference signal (RS) resource index $q_d$, and used for open loop power control. $\Delta_{TF,b,f,c}(i)$ is a PUSCH transmission power adjustment component, and $f_{b,f,c}(i, l)$ is a PUSCH power control adjustment state used for closed loop power control.

Although the equations for PUCCH and SRS differ slightly from each other and from the PUSCH equation [eq.2] in some aspects, they are from a high level perspective of closed loop and open loop power control quite similar. Therefore, we will focus the discussion in the following on PUSCH UL PC, but the discussion can easily be applied to PUCCH and SRS PC as well.

PUSCH Open Loop Power Control

As already mentioned above, the open loop PC is based on $PL_{b,f,c}(q_d)$ which is a downlink pathloss estimate in dB calculated by the UE by measuring on an RS represented by index $q_d$. Hence, by measuring on this RS the UE will be able to compensate for the pathloss by adjusting its transmission power. Furthermore, by controlling the configurable parameter $\alpha_{b,f,c}(j)$ it is also possible to control to what extent the UE should adjust its transmission power based on the open loop power control. The parameter $\alpha_{b,f,c}(j)$ can take on any value between 0 and 1, where $\alpha_{b,f,c}(j)=0$ means "no adjustment" and $\alpha_{b,f,c}(j)=1$ means "full adjustment".

PUSCH Closed Loop Power Control

The "closed-loop PC related" term $f_{b,f,c}(i, l)$ can be configured according to one of two modes: The TPC (Transmission Power Control) absolute mode, $f_{b,f,c}(i, l)=\delta_{PUSCH,b,f,c}(i, l)$, or the TPC accumulated mode, $f_{b,f,c}(i, l)=f_{b,f,c}(i-i_0, l)+\Sigma_{m=0}^{C(D_i)-1} \delta_{PUSCH,b,f,c}(m, l)$. Furthermore, the value $\delta_{PUSCH,b,f,c}(i, l)$ is the TPC command value signaled to the UE in the TPC Command field of a Downlink Control Information (DCI) message of format 0_0, format 0_1 or format 2_2. The possible values of $\delta_{PUSCH,b,f,c}(i, l)$ are given from the table below.

TABLE 7.1.1-1

| Mapping of TPC Command Field in DCI format 0_0, DCI format 0_1, or DCI format 2_2. | | |
|---|---|---|
| TPC Command Field | Accumulated $\delta_{PUSCH, b, f, c}$ or $\delta_{SRS, b, f, c}$ [dB] | Absolute $\delta_{PUSCH, b, f, c}$ or $\delta_{SRS, b, f, c}$ [dB] |
| 0 | −1 | −4 |
| 1 | 0 | −1 |
| 2 | 1 | 1 |
| 3 | 3 | 4 |

Hence, by using TPC the gNodeB will be able to impact the UE output power.

Beam Specific PUSCH Power Control

NR supports beam specific UL PC by e.g. letting $P_{O\_PUSCH,b,f,c}(j)$ be a function of the index j where $j \in \{0, 1, \ldots, J-1\}$. Hence, in this sense different beams (represented by different values of j) may be configured with different values of $P_{O\_PUSCH,b,f,c}$. Which beam j to use when deriving $P_{PUSCH,b,f,c}(i, j, q_d, l)$ for a given PUSCH transmission may in turn be signaled via a DCI message or via a medium access control (MAC) control element (CE). The same holds for $\alpha_{b,f,c}(j)$.

Furthermore, also $PL_{b,f,c}(q_d)$ may be beam specific in the sense that $q_d$ may be signaled to the UE with the implication that a different RS is used to perform the open loop power control. The UE is configured with a list mapping $q_d$ index to RS, and the index q is signaled through MAC or DCI, thus indicating to the UE what RS to measure on. FIG. 1 illustrates how the RS tied to the index $q_d$ is transmitted to the UE 102 by a single gNodeB or transmission point 101 of the network. The UE 102 may determine the pathloss based on measurements on the RS, and may then set the transmission power level for a PUSCH transmission using the open loop UL PC procedure.

As yet another component of the beam specific UL PC, there may be multiple sets of $f_{b,f,c}(i, 1)$ which are then controlled by the index l which can be signaled in DL.

Power Headroom Reporting

There are different kinds of power headroom reports (PHRs) in NR assuming e.g. PUSCH-only transmission or assuming combined PUSCH and PUCCH transmission etc. As an example, type 1 PHR (i.e. a UE power headroom that is valid for PUSCH) is given by:

$$PH_{type1,b,f,c}(i, j, q_d, l) =$$
$$P_{CMAX,f,c}(i) - \left\{ \begin{array}{c} P_{O\_PUSCH,b,f,c}(j) + 10\log_{10}\left(2^{\mu} \cdot M_{RB,b,f,c}^{PUSCH}(i)\right) + \alpha_{b,f,c}(j) \cdot \\ PL_{b,f,c}(q_d) + \Delta_{TF,b,f,c}(i) + f_{b,f,c}(i, l) \end{array} \right\}$$

Distributed Multiple Input Multiple Output (D-MIMO)

D-MIMO (sometimes also referred to as "cell-free massive MIMO", Radio Stripes, and Radio Weaves) is a key technology candidate for the sixth generation (6G) radio physical layer. The idea with D-MIMO is to distribute service antennas geographically and have them operate phase-coherently together. A typical architecture is that multiple antenna panels (also known as access points (APs) or Tx/Rx points (TRPs) or simply transmission points) are interconnected and configured in such a way that more than one panel can cooperate in coherent decoding of data from a given UE, and more than one panel can cooperate in coherent transmission of data to a UE. Each panel in turn may comprise multiple antenna elements that are configured to operate phase-coherently together. The preferred way of operation is in time-division duplexing (TDD), relying on reciprocity of the propagation channel, whereby uplink pilots transmitted by the UEs are used to obtain both the uplink and downlink channel responses simultaneously. This type of TDD operation is usually called reciprocity-based operation. Various research projects are addressing aspects relating to this architecture, such as the design of beamforming methods, and random access signaling and procedures.

To make deployment of a large number of D-MIMO access or transmission points simple and cost efficient, various solutions have been proposed, such as Radio Stripes and Radio Weaves. A common feature is to use a shared fronthaul together with a high degree of integration and miniaturization. Sometimes the electronic circuit containing the digital signal processor (DSP), antenna panel, and external interfaces for power supply and data is referred to as an antenna processing unit (APU). Hereinafter, we will refer to them as transmission points (TRPs). Note however that TRPs may not be visible physical boxes, they may in some cases be only the location of a small integrated circuit inside of a protective cable.

In D-MIMO, several TRPs may thus be used to perform a coordinated DL transmission and/or to receive a coordinated UL transmission. As an example, FIG. 2 illustrates five TRPs 101-1 to 101-5 and one UE 102. In this example, it is assumed that three of the TRPs 101-1 to 101-3 form a D-MIMO TRP set 103 serving the UE 102. The set 103 may be controlled by one or more gNodeBs. This means that the TRPs 101-1 to 101-3 belonging to the D-MIMO TRP set 103 jointly will perform DL transmissions to the UE 102 and/or UL reception of a transmission from the UE 102. Some examples of such transmissions are:

Coordinated (coherent or non-coherent) DL transmission from all, or a subset, of the TRPs in the D-MIMO TRP set 103;

DL transmission from one TRP that is selected from the TRPs in the D-MIMO TRP set 103;

Joint UL reception and processing by all, or a subset, of the TRPs in the D-MIMO TRP set 103;

UL reception using one selected TRP from the D-MIMO TRP set 103.

It is expected that the demand on capacity will increase in the future and in certain deployments D-MIMO may be a useful technique for meeting these demands. D-MIMO is therefore a candidate technology for future 3GPP standard releases, such as evolved 5G, beyond 5G, or 6G.

Much of the work related to D-MIMO has so far focused on rather idealized assumptions but when taking the step to make actual implementations it will be inevitable to also consider practical constraints which in turn will imply that other kinds of solutions will be required than the ones developed under idealized assumptions. One such problem area is UL PC where one will need to develop feasible and practical solutions. Therefore, a need exists to consider how to solve UL PC for a system applying D-MIMO.

SUMMARY

Several academic papers on UL power control, such as section 2.4 in "Ubiquitous cell-free massive MIMO communications", G. Interdonato, E. Björnsson, H. Q. Ngo, P. Frenger, and E. G. Larsson, EURASIP Journal om Wireless Communications and Networking, 2019 and references therein, provide different solutions for how the UE may determine a suitable UL transmission power level based on how the network may process UL receptions in a D-MIMO system. In reality, the UE may not know what processing method the network is using for UL reception and hence the UE does not know what UL PC it should apply. Further, the UE may, while in active mode, move between traditional single cell deployments where one gNodeB/TRP is serving the single cell (see FIG. 1), and D-MIMO deployments where a cell is served by multiple TRPs (see FIG. 2), thus dynamically putting different requirements on the UL PC.

The disclosed technology seeks to mitigate, obviate, alleviate, or eliminate one or more of the above example problems and improve communication in a radio access network. Various aspects of the disclosed technology are as set out in this summary section with examples of some embodiments.

A first aspect of the disclosed technology relates to a method performed by a wireless device for determining a transmission power level for a physical uplink channel of a wireless communication network. The method comprises receiving information from a network node, the information being related to a configuration of multiple transmission points used for downlink transmissions to the wireless device. The method also comprises receiving signals from the multiple transmission points based on the information, and estimating a pathloss value for each of at least two transmission points among the multiple transmission points based on the received signals. The method further comprises determining a single value based on a function of the estimated pathloss values, and determining the transmission power level based on the single value.

A second aspect of the disclosed technology relates to a method performed by a network node for enabling a wireless device to determine a transmission power level for a physical uplink channel of a wireless communication network. The method comprises transmitting information to the wireless device, the information being related to a configuration of multiple transmission points used for downlink transmissions to the wireless device. The method also comprises transmitting signals from the multiple transmission points based on the information, the transmitted information and signals enabling the wireless device to determine the transmission power level based on a function of estimated pathloss values for the multiple transmission points.

Other aspects of the disclosed technology relates to network nodes (e.g., base stations, eNodeBs, gNodeBs, etc., or components thereof) and wireless devices or UEs configured to perform operations corresponding to the first and the second aspect. Other aspects relates to non-transitory, computer-readable media storing program instructions that, when executed by processing circuitry of such network nodes or wireless devices, configure the same to perform operations corresponding to the first and the second aspect.

Certain embodiments may provide one or more of the following technical advantages. One technical advantage of embodiments may be that they provide a feasible solution for how to standardize UL PC in the case of D-MIMO. Another technical advantage of embodiments may be that they allow the UE to correctly determine a suitable UL transmission power in different deployments, regardless of the UL processing method in the network. There may e.g. be different types of D-MIMO UL signal processing methods as will be further described below. The proposed embodiments allow the UE to use one single method for obtaining pathloss values to be used for UL PC regardless of the network deployment or the network D-MIMO UL signal processing method, which has the technical advantage of reducing UE implementation and testing complexity.

These and other objects, features and advantages of the exemplary embodiments of the present disclosure will become apparent upon reading the following detailed description of the exemplary embodiments of the present disclosure.

BRIEF DESCRIPTION OF THE DRAWINGS

Some embodiments of the disclosed technology are described below with reference to the accompanying drawings which are by way of example only and in which:

FIG. 4 is a flow diagram schematically illustrating an example of a method performed by a wireless device according to some embodiments of the disclosed technology;

FIGS. 9-12 are flow diagrams illustrating exemplary methods and/or procedures implemented in a communication system, according to various exemplary embodiments of the present disclosure.

DETAILED DESCRIPTION

Aspects of the present disclosure will be described more fully hereinafter with reference to the accompanying drawings. The apparatus and method disclosed herein can, however, be realized in many different forms and should not be construed as being limited to the aspects set forth herein.

Figure 1:
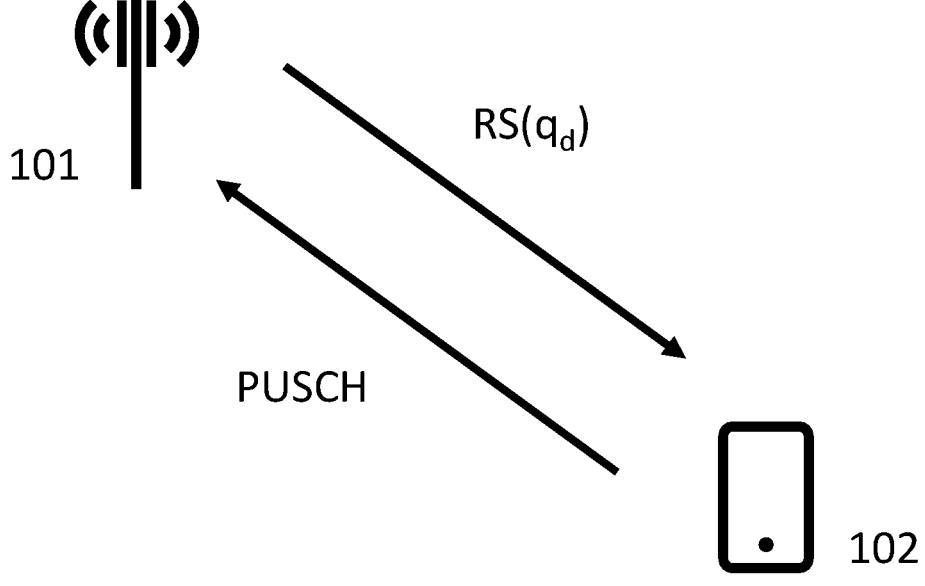
FIG. 1 schematically illustrates a radio access network and signaling of RS to the UE for determining the pathloss needed for the PC of a PUSCH transmission.
Figure 2:
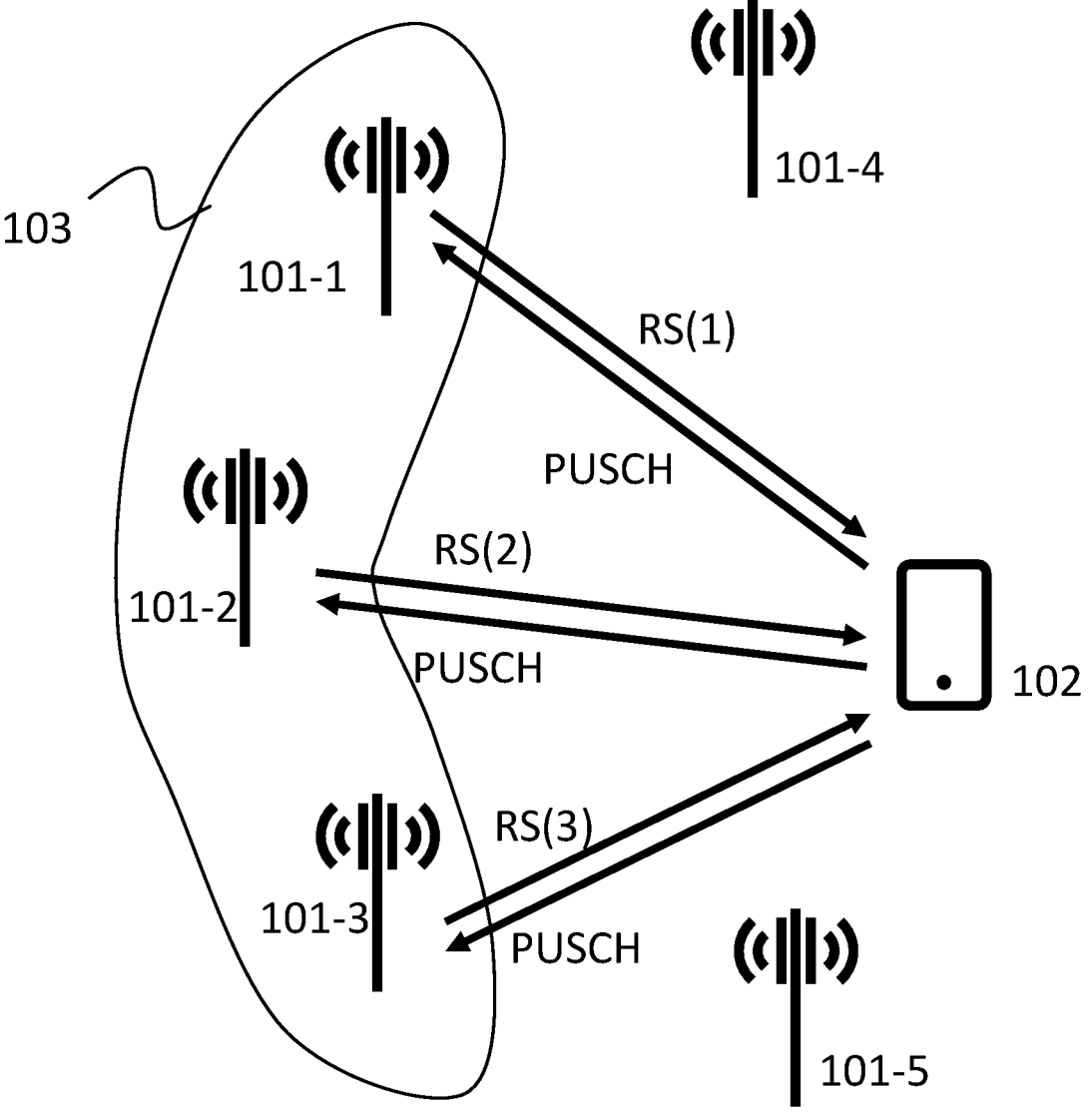
FIG. 2 schematically illustrates an example of a wireless communications network applying D-MIMO in which a set of three TRPs jointly may serve a UE.

As previously described with reference to FIG. 2, a plurality of TRPs may form a D-MIMO TRP set serving a UE, where the TRPs 101-1 to 101-3 belonging to the D-MIMO TRP set 103 may e.g. jointly perform DL transmissions to the UE 102. When referring to such DL transmission of signals, a TRP may sometimes simply be referred to as a transmission point. In comparison to the situation described with reference to FIG. 1 in which the UE can determine an uplink transmission power level based on a single TRP RS transmission, the scenario in FIG. 2 involves RS transmissions from multiple different TRPs, such as the D-MIMO TRP set 103, to take into account for determining the transmission power level for an uplink transmission. RS(k) represents a signal transmitted in DL originating from TRP number k. Although the signals transmitted in DL in FIG. 2 refers to an RS transmission, the signals are not limited to RSs. In embodiments, the signals transmitted in DL may correspond to anyone of the following:

An RS such as a channel state information reference signal (CSI-RS), a Synchronization Signal Block (SSB), or a demodulation reference signal (DMRS);

A signal transmitted in DL defined by a port of the signal;

A signal transmitted on a data channel such as on a Physical Downlink Shared Channel (PDSCH).

The signals from the different TRPs may be performed on a same or on different time and frequency resources. Hence RS(1) may or may not be transmitted on the same time and frequency resource as RS(2). It is also possible that RS(1) and RS(2) are of different types, e.g. RS(1) corresponds to CSI-RS whereas RS(2) corresponds to DMRS.

According to embodiments, the UE will estimate the pathloss $PL_{b,f,c}(k)$, or a value related to pathloss, for the signals RS(k) transmitted from the transmission points. These set of values may then be used in a function of the estimated pathloss values, which may also be referred to as a pathloss function $PL_{b,f,c}(PL_{b,f,c}(1), PL_{b,f,c}(2), \ldots, PL_{b,f,c}(K))$, where it is assumed that the indexes $k=1, 2, \ldots, K$ corresponds to, or numbers, the different transmission points of the D-MIMO TRP set. The output of the pathloss function provides a single value which may then be used to determine the transmission power level to be applied when transmitting a physical uplink channel such as the PUSCH.

An alternative way to write the pathloss function $PL_{b,f,c}$ $(PL_{b,f,c}(1), PL_{b,f,c}(2), \ldots, PL_{b,f,c}(K))$ is to describe it as a function of the RSs: $PL_{b,f,c}(RS(1), RS(2), \ldots, RS(K))$. Another alternative is to describe it as a function of or the RSs indices: $PL_{b,f,c}(1, 2, \ldots, K)$. These different ways of notation are however equivalent, and hereinafter the notation $PL_{b,f,c}(PL_{b,f,c}(1), PL_{b,f,c}(2), \ldots, PL_{b,f,c}(K))$ will be used. It should be noted that although some of the embodiments for pedagogical reasons are presented as the RS corresponding to index K originates from TRP K, it is not necessarily so that the UE has access to information about which TRP a certain RS originates from. From the UE's perspective this may be transparent in the sense that the UE will measure on an RS corresponding to index K, while the network will decide from which TRP this RS will be transmitted.

In one embodiment, a similar equation as the one specified in current NR standard specification (see [eq.2] in background section above) can thus be used for UL PC, in which the value of the pathloss parameter PL is replaced by the pathloss function providing a single value from the pathloss values determined through measurement of the RS(k) from the D-MIMO TRP set:

$$P_{PUSCH,b,f,c}(i, j, l) =$$

$$\min \begin{cases} P_{CMAX,f,c}(i), \\ P_{O\_PUSCH,b,f,c}(j) + 10\log_{10}\left(2^{\mu} \cdot M_{RB,b,f,c}^{PUSCH}(i)\right) + \alpha_{b,f,c}(j) \cdot \\ \qquad PL_{b,f,c}(PL_{b,f,c}(1), PL_{b,f,c}(2), \ldots, PL_{b,f,c}(K)) + \\ \qquad\qquad\qquad\qquad \Delta_{TF,b,f,c}(i) + f_{b,f,c}(i, l) \end{cases}$$

In one embodiment, one out of multiple available RSs from a TRP can be used in the pathloss function. If for instance Q different RS:s have been configured (such as CSI-RS and DMRS exemplified above), these RS's may be referred to by an index $q_k \in \{1, 2, \ldots, Q\}$. In a more general term this may be written as:

$$P_{PUSCH,b,f,c}(i, j, q_1, q_2 \ldots, q_K, l) =$$

$$\min \begin{cases} P_{CMAX,f,c}(i), \\ P_{O\_PUSCH,b,f,c}(j) + 10\log_{10}\left(2^{\mu} \cdot M_{RB,b,f,c}^{PUSCH}(i)\right) + \alpha_{b,f,c}(j) \cdot \\ \qquad PL_{b,f,c}(PL_{b,f,c}(q_1), PL_{b,f,c}(q_2), \ldots, PL_{b,f,c}(q_K)) + \\ \qquad\qquad\qquad\qquad \Delta_{TF,b,f,c}(i) + f_{b,f,c}(i, l) \end{cases} [dBm]$$

where it is assumed that $PL_{b,f,c}(q_k)$ is the pathloss value estimated based on the RS represented by $q_k$ and that this RS in turn is transmitted from TRP k.

In one embodiment, the function of the estimated pathloss values—also referred to as the pathloss function—is given by the following:

$$PL_{b,f,c}(PL_{b,f,c}(1), PL_{b,f,c}(2), \ldots, PL_{b,f,c}(K)) = \qquad\text{(fct 1)}$$
$$dB\left(\sum_{k=1}^{K} dB^{-1}(PL_{b,f,c}(k))\right)$$

where it is assumed that dB(x) is a function converting the value x to dB and $dB^{-1}(y)$ is its inverse operation so that $dB^{-1}(dB(x))=x$. This function will hence relate to the estimated received sum effect at the network side. The single value is thus determined based on a function of a sum of the respective pathloss values for the TRPs of a D-MIMO TRP set. Such a function may be appropriate if for instance an linear minimum mean square error (MMSE) type of receiver is used for the uplink processing at the TRPs of the D-MIMO TRP set.

In other embodiments, the pathloss function is designed to relate to the strongest, or alternatively the weakest, TRP. Such a function may be appropriate in a simpler receiver scheme, such as a dynamic TRP selection scheme. The pathloss function may in this case be given by one of the following:

$$PL_{b,f,c}(PL_{b,f,c}(1), PL_{b,f,c}(2), \ldots, PL_{b,f,c}(K)) = \min_{k=1,2,\ldots,K} PL_{b,f,c}(k) \quad \text{(fct 2a)}$$

or $$PL_{b,f,c}(PL_{b,f,c}(1), PL_{b,f,c}(2), \ldots, PL_{b,f,c}(K)) = \max_{k=1,2,\ldots,K} PL_{b,f,c}(k). \quad \text{(fct 2b)}$$

The strongest TRP function (fct 2b) may be selected for substantially stationary UEs or for UEs with low priority or UEs with latency tolerant services. In such cases, using the strongest TRP when determining a pathloss value provides more robustness.

Using the weakest TRP when determining a pathloss value (fct 2a) ensures that all TRPs will receive an uplink signal with sufficient power. This will in turn enable efficient uplink TRP joint processing on the network side.

In one embodiment the UE can be configured to use one out of many different functions $P_{PUSCH,b,f,c}(i, j, l)$ or $PL_{b,f,c}$ $(PL_{b,f,c}(1), PL_{b,f,c}(2), \ldots, PL_{b,f,c}(K))$ when determining the PUSCH transmission power level. Consequently, this will allow the network node(s) to match the UL PC behavior to different kinds of receiver structures. This will in turn enable efficient implementation of TRPs or gNodeBs using different receivers, such as MMSE or dynamic TRP selection receivers.

In embodiments where the UE may select one out of many different functions when determining the PUSCH transmission power level, an index d may be used to represent the different functions:

$$P_{PUSCH,b,f,c}(d, i, j, l) =$$

$$\min \begin{cases} P_{CMAX,f,c}(i), \\ P_{O\_PUSCH,b,f,c}(d, j) + 10\log_{10}\left(2^{\mu} \cdot M_{RB,b,f,c}^{PUSCH}(i)\right) + \alpha_{b,f,c}(d, j) \cdot \\ \qquad PL_{b,f,c}(d, PL_{b,f,c}(1), PL_{b,f,c}(2), \ldots, PL_{b,f,c}(K)) + \\ \qquad\qquad\qquad \Delta_{TF,b,f,c}(i) + f_{b,f,c}(i) + f_{b,f,c}(d, i, l) \end{cases}$$

where $PL_{b,f,c}$ (1, $PL_{b,f,c}(1)$, $PL_{b,f,c}(2)$, $\ldots$, $PL_{b,f,c}(K)$) corresponds to one function, such as fct 2a, whereas $PL_{b,f,c}(2, PL_{b,f,c}(1), PL_{b,f,c}(2), \ldots, PL_{b,f,c}(K))$ corresponds to another function, such as fct 1.

It may also be so that the reference signals used for the different functions depend on d:

$$P_{PUSCH,b,f,c}(d, i, j, l) =$$

$$\min \begin{cases} P_{CMAX,f,c}(i), \\ P_{O\_PUSCH,b,f,c}(d, j) + 10\log_{10}\left(2^{\mu} \cdot M_{RB,b,f,c}^{PUSCH}(i)\right) + \alpha_{b,f,c}(d, j) \cdot \\ \quad PL_{b,f,c}\left(d, PL_{b,f,c}(q_{d,1}), PL_{b,f,c}, \dots , PL_{b,f,c}\left(q_{d,k_d}\right)\right) + \\ \quad\quad\quad\quad \Delta_{TF,b,f,c}(i) + f_{b,f,c}(d, i, l) \end{cases}$$

As an example, there may be three supported functions, respectively represented by d=1, d=2, and d=3. The function d=1 may correspond to the single cell/TRP case with $K_d$=1, where the UL PC is using the function as defined in prior art (see [eq. 2] in background section). The function d=2 may correspond to a D-MIMO case with a plurality of TRPs in the TRP set, where a certain number of TRPs are measured on and thus a certain number of pathloss estimates $K_2$ are used in the function. The function d=3 may correspond to another D-MIMO case, where a different number of pathloss estimates $K_d$ are used in the function. $K_2 \neq K_3$ thus implies that a different number of pathloss estimates are used for the different functions d=2 and d=3. This thus exemplifies the possibility to support single cell PC as well as different D-MIMO PC with different pathloss functions and taking different number of TRPs into account in the D-MIMO TRP set by using different values for d.

In embodiments, several different D-MIMO products or receivers types may be implemented in the gNodeB/TRP. A first receiver type may be simpler and less expensive, where the selected D-MIMO UL processing method is using selection of the strongest TRP in a dynamic fashion. A second receiver type may be more complex and expensive using e.g. MMSE receivers to achieve improved performance. In a case where a UE is served by a gNodeB implementing the first receiver type, the UE may be configured to use the pathloss function fct 2b corresponding to dynamic TRP selection for deriving the PUSCH transmission power level, whereas a UE served by a gNodeB implementing the second receiver type may be configured to use another function such as fct 1 above to derive the PUSCH transmission power level. In another embodiment, a third receiver type can run multiple kinds of D-MIMO UL processing methods, and the gNodeB implementing the third receiver type may in a dynamic fashion switch between the different UL processing methods and consequently also between different PUSCH PC functions. The switch may e.g. be load dependent. In yet one other embodiment, different D-MIMO UL processing methods may be implemented as different software features, and an operator may hence install one or several of the features. Once activated, one or several of the different UL PC functions may be used in the network.

The network may control which of the plurality of different UL PC and/or pathloss functions a UE should use through signaling. In one example embodiment, this signaling comprises that the gNodeB configures the UE to use one out of the multiple functions d=1, d=2, and d=3 described in previous embodiments. This may be done through Radio Resource Configuration (RRC) signaling or configuration signaling via a MAC-CE. Additionally or alternatively, information affecting which one of the multiple functions to use may in embodiments be comprised in DCI where the value of one or a few bits may indicate to the UE which one out of the multiple functions that the UE should use.

In yet another embodiment, the term $\alpha_{b,f,c}(j)$, representing a scaling factor in the UL PC function used for determining the transmission power level, is extended to be set in a TRP specific manner. This means that the UL PC function comprises one $\alpha_{b,f,c}(j, k)$ per k. The effect of this is that it makes it possible to adapt how much the UL transmission power level is affected by the different TRPs. According to one example embodiment, setting $\alpha_{b,f,c}(j, k_1)$ to a larger value than $\alpha_{b,f,c}(j, k_2)$ may imply that the TRP corresponding to $k_1$ will impact the UL power setting to a larger extent than the TRP corresponding to $k_2$ (or vice versa). The respective pathloss functions fct 1 and fct 2a-b may in this embodiment instead be expressed as:

$$PL_{b,f,c}(PL_{b,f,c}(1), PL_{b,f,c}(2), \dots , PL_{b,f,c}(K)) =$$
$$dB\left(\sum\nolimits_{k=1}^{K} dB^{-1}(\alpha_{b,f,c}(j, k)PL_{b,f,c}(k))\right)$$

$$PL_{b,f,c}(PL_{b,f,c}(1), PL_{b,f,c}(2), \dots , PL_{b,f,c}(K)) =$$
$$\min_{k=1,2,\dots,K}(\alpha_{b,f,c}(j, k)PL_{b,f,c}(k))$$

$$PL_{b,f,c}(PL_{b,f,c}(1), PL_{b,f,c}(2), \dots , PL_{b,f,c}(K)) =$$
$$\max_{k=1,2,\dots,K}(\alpha_{b,f,c}(j, k)PL_{b,f,c}(k))$$

In yet another embodiment, $\alpha_{b,f,c}(j, k)$ is set as a function of the values $PL_{b,f,c}(1), PL_{b,f,c}(2), \dots , PL_{b,f,c}(K)$, such that $\alpha_{b,f,c}(j, k)$ is set per TRP in a dynamic fashion. In one exemplary embodiment, $\alpha_{b,f,c}(j, k)$ may for instance be set according to the following:

TRP $k_1$ corresponds to the smallest measured pathloss value, and therefore $\alpha_{b,f,c}(j, k_1)=\alpha_1$, TRP $k_2$ corresponds to the second smallest measured pathloss value, and therefore $\alpha_{b,f,c}(j, k_2)=\alpha_2$, and for all other TRPs $\alpha_{b,f,c}(j, k)=0$ such that they do not contribute to the UL PC.

As these values are set dynamically, the UL PC will change as the UE moves in the network due to that the UE mobility will affect the pathloss estimations and thus the values of $\alpha_{b,f,c}(j, k)$.

In one embodiment, the pathloss function $PL_{b,f,c}(PL_{b,f,c}(1), PL_{b,f,c}(2), \dots , PL_{b,f,c}(K))$ may be used also for determining the PHR. As an example, type 1 PHR may be written as follows:

$$PH_{type1,b,f,c}(i, j, l) =$$
$$P_{CMAX,f,c}(i) - \begin{pmatrix} P_{O\_PUSCH,b,f,c}(j) + 10\log_{10}\left(2^{\mu} \cdot M_{RB,b,f,c}^{PUSCH}(i)\right) + \alpha_{b,f,c}(j) \cdot \\ PL_{b,f,c}(PL_{b,f,c}(1), PL_{b,f,c}(2), \dots , PL_{b,f,c}(K)) + \\ \Delta_{TF,b,f,c}(i) + f_{b,f,c}(i, l) \end{pmatrix}$$

In one embodiment the notion of the D-MIMO TRP set exists already during random access and the PRACH UL power control may then based on the pathloss function $PL_{b,f,c}(PL_{b,f,c}(1), PL_{b,f,c}(2), \dots , PL_{b,f,c}(K))$. The UL PC function for PRACH may thus in one example embodiment be written as follows:

$$P_{PRACH,b,f,c}(i) =$$
$$\min \begin{cases} P_{CMAX, f, c}(i), \\ \quad\quad P_{PRACH,target,f,c} + \\ PL_{b,f,c}(PL_{b,f,c}(1), PL_{b,f,c}(2), \dots , PL_{b,f,c}(K)) \end{cases} [dBm].$$

Figure 3:
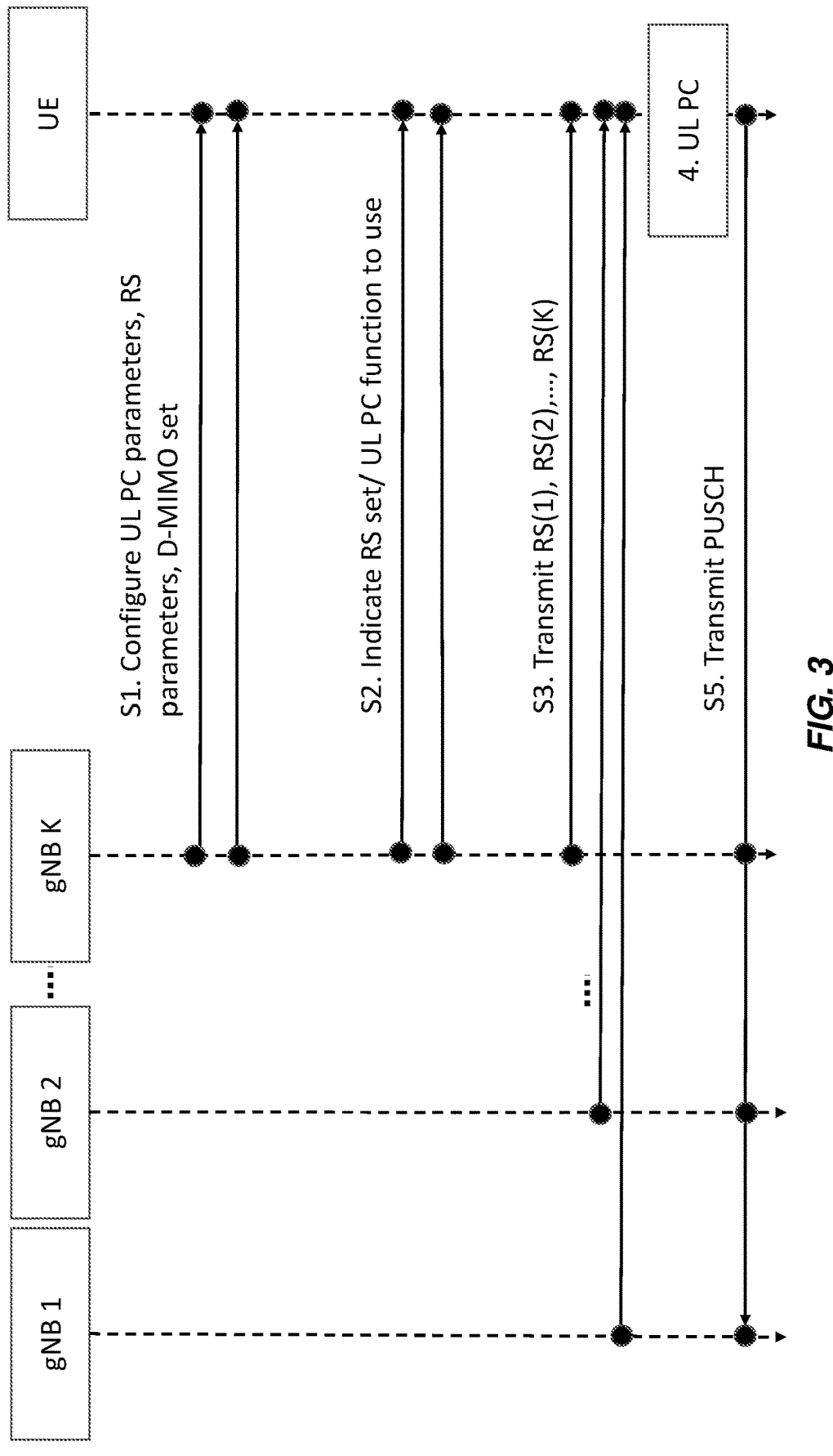
FIG. 3 is a signaling diagram schematically illustrating embodiments of the disclosed technology.

FIG. 3 is a signaling diagram schematically illustrating embodiments of the disclosed technology. In the embodiment in FIG. 3 it is assumed that one gNodeB (gNB) among a plurality of gNodeBs controlling a D-MIMO TRP set used for PUSCH reception is responsible for the configuration signaling to the UE needed for UL PC. However, in another embodiment, several of the plurality of gNodeBs controlling the D-MIMO TRP set may take part in the configuration, thus allowing for D-MIMO gains in the DL configuration signaling. In still other embodiments, a mix of the two previously described embodiments is possible, allowing for some of the configuration steps to be done using D-MIMO and a set of TRPs and some to involve signaling from only one gNodeB or TRP. Furthermore, a transmission from one gNodeB to a given UE may be transmitted on a same or on different time and frequency resources as a transmission from another gNodeB to the UE.

In FIG. 3, the signaling in S1 may comprise configuration of parameters related to the UL PC, and S2 involves signaling which indicates or controls what RS among the configured RS to actually measure on, as well as signaling which indicates or controls what pathloss or UL PC function to use for determining the UL transmission power level. The S1 configuration may e.g. comprise configuration related to: pathloss functions to use for the UL PC, values of parameters of the pathloss function or of the function used for determining the UL transmission power level, signals such as RS from the multiple TRPs to measure for estimating the pathloss values, the configuration of the D-MIMO TRP set. The signaling in S1 and S2 may typically be done through RRC configuration and/or MAC-CE configuration. However, some of the parameters may alternatively be comprised in a DCI or DCI like message. Although S1 and S2 are illustrated as separate signaling in FIG. 3, the information described may be comprised in a same message.

In embodiments, the UE may not need to know about the D-MIMO TRP set configuration. The UE may e.g. only be informed about what RS(s) to receive and measure on, without knowing anything more about the transmitting TRPs. In other embodiments, the D-MIMO TRP set and/or the size of the D-MIMO TRP set to use when deriving $P_{PUSCH,b,f,c}$ is explicitly signaled to the UE though e.g. RRC configuration. In still other embodiments, information related to the D-MIMO TRP set is given implicitly from another configuration or configuration message, such as a configuration for PUSCH from which some of the parameters are used or derived for use in the UL PC.

In one example embodiment, the S2 signaling of RS indices $q_1, q_2, \ldots, q_K$ may be done via DCI and may then be used to derive the single value from the pathloss function $PL_{b,f,c}(PL_{b,f,c}(q_1), PL_{b,f,c}(2), \ldots, PL_{b,f,c}(q_K))$, which in turn is used to derive the PUSCH transmission power level. In another example embodiment, an index q is instead signaled in the DCI where each q is mapped to a given set of values $q_1, q_2, \ldots, q_K$ which are then used similarly as in the previous example. The different sets of values $q_1, q_2, \ldots, q_K$ and the mapping may in turn be configured though RRC, e.g. in S1 configuration.

In FIG. 3, S3 corresponds to the signaling of the RS from the plurality of D-MIMO TRPs. In S3, the UE receives the RS indicated by the signaling in S2. In step 4, the UE estimates pathloss values for at least two of the multiple TRPs based on the received signals, and then uses a function of the estimated pathloss values (also referred to as the pathloss function) to determine a single value. This single value is then used for determining the transmission power level to use for the PUSCH transmission. S5 illustrates the transmitting of the PUSCH using the transmission power level determined in step 4.

FIG. 4 illustrates a method (e.g., procedure) for determining a transmission power level for a physical uplink channel of a wireless communication network according to various exemplary embodiments of the present disclosure. For example, the method shown in FIG. 4 can be performed by or implemented in a wireless device or UE configured as described elsewhere herein. The physical uplink channel may be at least one of: a physical random access channel, a physical uplink shared channel, and a physical uplink control channel.

The exemplary method illustrated in FIG. 4 can include the operations of the following blocks:

410: Receiving information from a network node, the information being related to a configuration of multiple transmission points used for downlink transmissions to the wireless device. This step may correspond to signaling in S1 and S2 as described with reference to FIG. 3 above.

420: Receiving signals from the multiple transmission points based on the information. This may correspond to S3 in FIG. 3. Receiving the signals may comprise receiving one of: reference signals; ports of a signal; and physical downlink shared channel signals.

430: Estimating a pathloss value for each of at least two transmission points among the multiple transmission points based on the received signals.

440: Determining a single value based on a function of the estimated pathloss values. In embodiments, the single value is determined to be a maximum value of the estimated path loss values. Alternatively, the single value is determined to be a minimum value of the estimated path loss values. In still another alternative, the single value is determined based on a function of a sum of the pathloss values.

450: Determining the transmission power level based on the single value.

Steps 430-450 may together correspond to step 4 of FIG. 3. In an optional embodiment, the method may include the operations of the following block:

460: Transmitting on the physical uplink channel using the determined transmission power level. This step may correspond to S5 in FIG. 3.

The information received in 410 may in embodiments comprise at least one of: an indication of the function of the estimated pathloss values to use for determining the single value; values of parameters of the function of the estimated pathloss values to use for determining the single value; an indication of the signals from the multiple transmission points to use for estimating the pathloss values; configuration information for the multiple transmission points.

In embodiments, receiving 410 the information further comprises receiving 411 information configuring a plurality of different functions of the estimated path loss values. The method may further comprise selecting 435 one of the plurality of different functions of the estimated path loss values as the function to use for determining the single value based on the received indication of the function of the estimated path loss values to use.

In embodiments, the function of the estimated path loss values to use for determining the single value comprises scaling factors to apply to the respective estimated path loss values, wherein the scaling factors are specific for at least one of: the transmission points from which the signals are received; and a type of the received signals. In embodiments, the method may further comprise adapting the scaling factors based on the estimated path loss values, as already described previously.

In embodiments, the method further comprises transmitting a power headroom report, PHR, to the network node, wherein the PHR is determined based on the function of the estimated path loss values.

In embodiments, the information in step 410 is received from a plurality of network nodes, each network node being related to a transmission point of the multiple transmission points. In some embodiments, some information may be received from several transmission points while other information is received from only one transmission point or a different set of transmission points.

Figure 5:
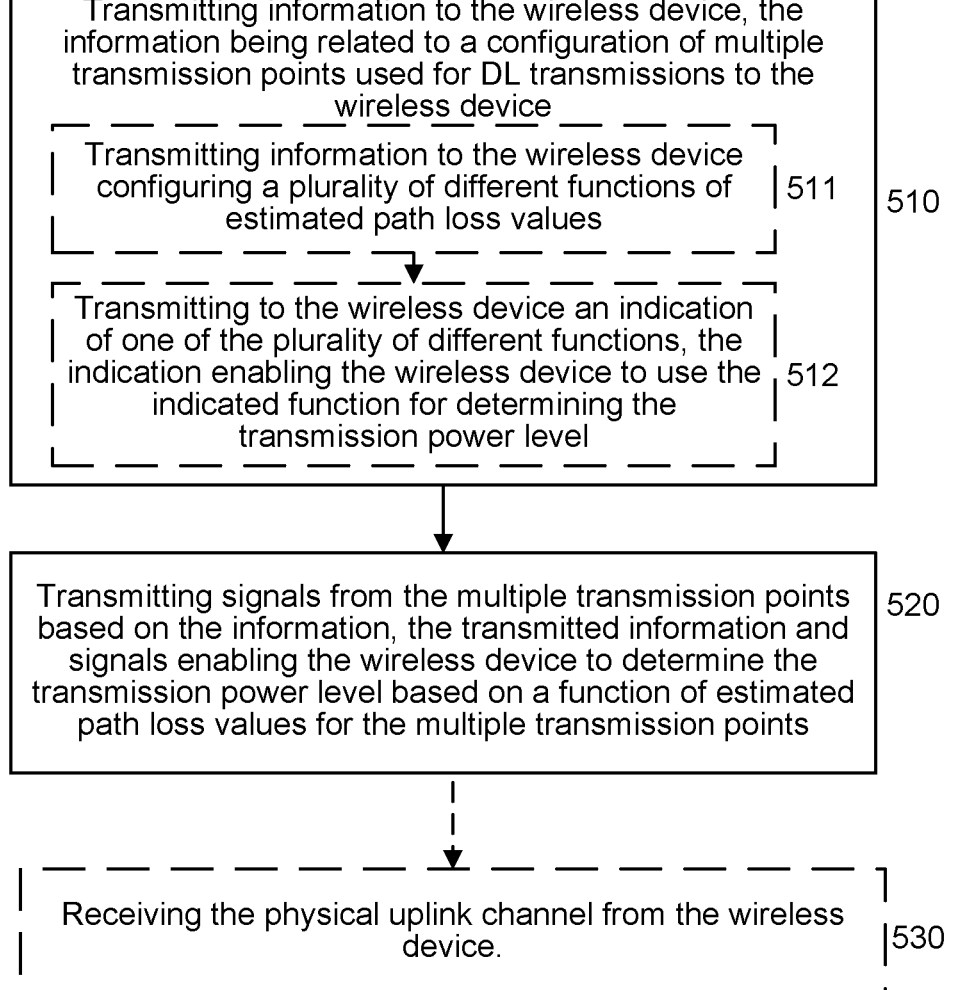
FIG. 5 is a flow diagram schematically illustrating an example of a method performed by a network node according to some embodiments of the disclosed technology.

FIG. 5 illustrates a method (e.g., procedure) for enabling a wireless device to determine a transmission power level for a physical uplink channel of a wireless communication network according to various exemplary embodiments of the present disclosure. For example, the method shown in FIG. 5 can be performed by or implemented in a network node, TRP, transmission point, or gNodeB configured as described elsewhere herein. The physical uplink channel may be at least one of: a physical random access channel, a physical uplink shared channel, and a physical uplink control channel.

The exemplary method illustrated in FIG. 5 can include the operations of the following blocks:

510: Transmitting information to the wireless device, the information being related to a configuration of multiple transmission points used for downlink transmissions to the wireless device. This step may correspond to signaling in S1 and S2 as described with reference to FIG. 3 above, and to step 410 of FIG. 4.

520: Transmitting signals from the multiple transmission points based on the information, the transmitted information and signals enabling the wireless device to determine the transmission power level based on a function of estimated path loss values for the multiple transmission points. This step may correspond to signaling in S3 as described with reference to FIG. 3 above, and to step 420 of FIG. 4. Transmitting the signals may comprise transmitting one of: reference signals; ports of a signal; and physical downlink shared channel signals.

In embodiments, transmitting 510 the information comprises transmitting 511 information to the wireless device configuring a plurality of different functions of estimated path loss values, and transmitting 512 to the wireless device an indication of one of the plurality of different functions, the indication enabling the wireless device to use the indicated function for determining the transmission power level.

In an optional embodiment, the method may include the operations of the following block:

530: Receiving the physical uplink channel from the wireless device.

In embodiments, the transmitted information in 510 comprises at least one of values of parameters of the function of the estimated path loss values; an indication of the signals from the multiple transmission points to use for estimating the path loss value; and configuration information for the multiple transmission points.

In embodiments, the function of the estimated path loss values comprises scaling factors to apply to the respective estimated path loss values, wherein the scaling factors are specific for at least one of: the TRP from which the signal is transmitted; and a type of the transmitted signal.

In embodiment, the method further comprises receiving a power headroom report from the wireless device determined based on the function of the estimated path loss values.

Figure 6:
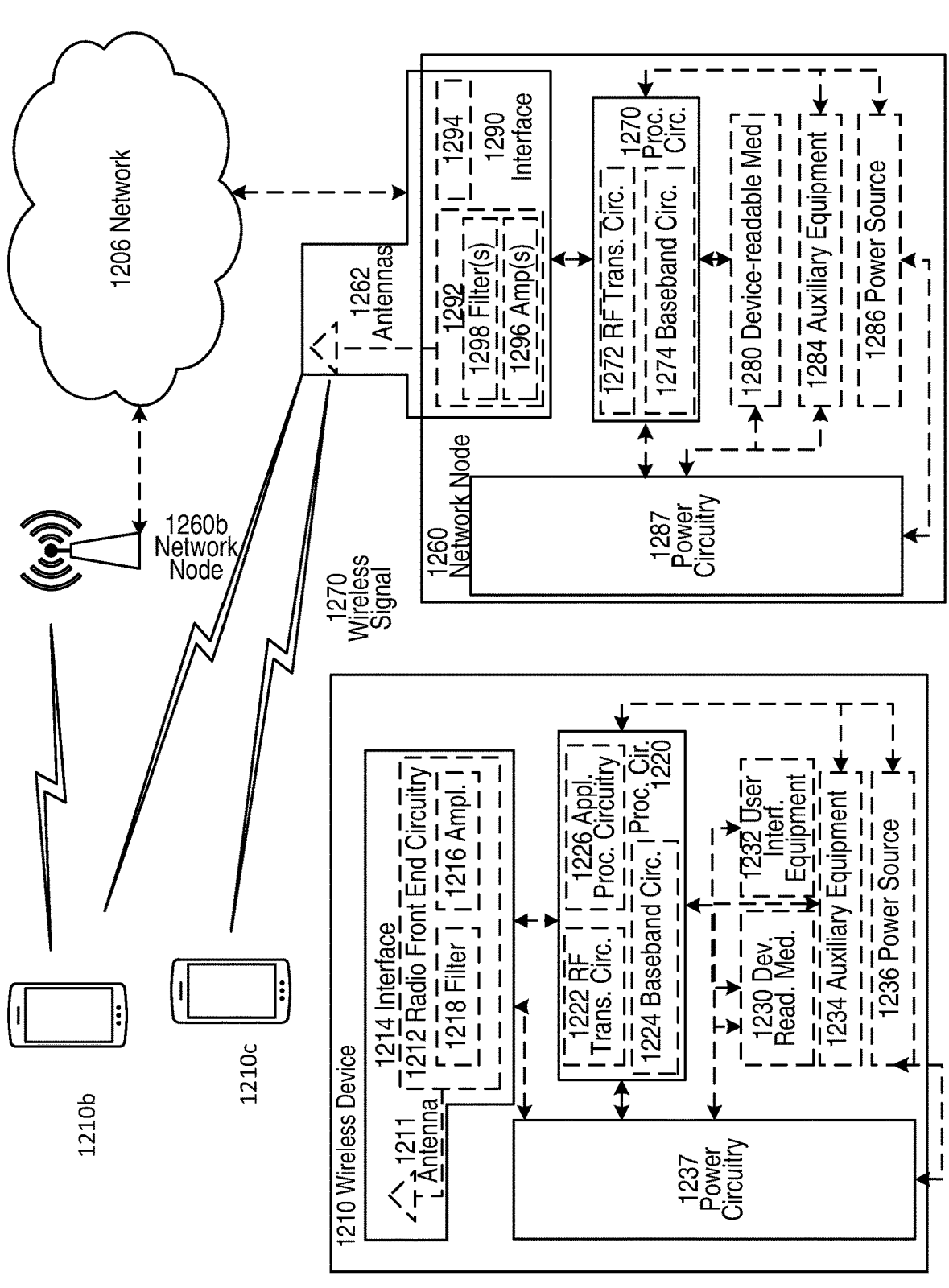
FIG. 6 is a block diagram illustrating an exemplary wireless communication network comprising the wireless device and the network node according to various embodiments of the present disclosure.

FIG. 6 illustrates a wireless device 1210 configured to determine a transmission power level for a physical uplink channel of a wireless communication network. The wireless device is further configured to receive information from a network node 1260, the information being related to a configuration of multiple transmission points used for downlink transmissions to the wireless device. The wireless device is also configured to receive signals from the multiple transmission points based on the information; estimate a path loss value for each of at least two transmission points among the multiple transmission points based on the received signals; determine a single value based on a function of the estimated path loss values; and determine the transmission power level based on the single value.

In embodiments, the wireless device may be further configured to transmit on the physical uplink channel using the determined transmission power level.

In embodiments, the wireless device may be configured to receive the information by being configured to receive at least one of an indication of the function of the estimated path loss values to use for determining the single value; values of parameters of the function of the estimated path loss values to use for determining the single value; an indication of the signals from the multiple transmission points to use for estimating the path loss values; and configuration information for the multiple transmission points.

In embodiments, the wireless device may be configured to receive the information by being configured to receive information configuring a plurality of different functions of the estimated path loss values. The wireless device may be further configured to select one of the plurality of different functions of the estimated path loss values as the function to use for determining the single value based on the received indication of the function of the estimated path loss values to use.

In embodiments, the wireless device may be configured to receive the signals by being configured to receive one of: reference signals; ports of a signal; and physical downlink shared channel signals.

In embodiments, the function of the estimated path loss values to use for determining the single value comprises scaling factors to apply to the respective estimated path loss values, wherein the scaling factors are specific for at least one of: the transmission points from which the signals are received; and a type of the received signals.

In embodiments, the wireless device may be configured to adapt the scaling factors based on the estimated path loss values.

In embodiments, the wireless device may be configured to transmit a power headroom report, PHR, to the network node, wherein the PHR is determined based on the function of the estimated path loss values.

In embodiments, the wireless device may be configured to receive the information from a plurality of network nodes, each network node being related to a transmission point of the multiple transmission points.

In embodiments, the physical uplink channel is at least one of: a physical random access channel, a physical uplink shared channel, a physical uplink control channel.

In embodiments, the wireless device may be configured to determine the single value based on the function of the estimated path loss values by being configured to one of: determine the single value to be a maximum value of the estimated path loss values; determine the single value to be a minimum value of the estimated path loss values; and determine the single value based on a function of a sum of the pathloss values.

FIG. 6 further illustrates the wireless device 1210 configured to determine a transmission power level for a physical uplink channel of a wireless communication network, where the wireless device comprises communication interface circuitry 1214 configured to communicate with a network node 1260, and processing circuitry 1220 operably coupled with the communication interface circuitry, whereby the processing circuitry and the communication interface circuitry are configured to perform the operations described with reference to FIG. 4.

In embodiments, a non-transitory, computer-readable medium stores computer-executable instructions that, when executed by processing circuitry 1220 of a wireless device 1210, configure the wireless device to perform operations described with reference to FIG. 4.

Further, in embodiments, a computer program product comprising computer-executable instructions is provided. The instructions, when executed by processing circuitry 1220 of a wireless device 1210, configure the wireless device to perform operations corresponding to the ones described with reference to FIG. 4.

FIG. 6 also illustrates a network node 1260 configured to enable a wireless device 1210 to determine a transmission power level for a physical uplink channel of a wireless communication network. The network node is further configured to transmit information to the wireless device, the information being related to a configuration of multiple transmission points used for downlink transmissions to the wireless device. The network node is also configured to transmit signals from the multiple transmission points based on the information, the transmitted information and signals enabling the wireless device to determine the transmission power level based on a function of estimated path loss values for the multiple transmission points.

In embodiments, the network node may be further configured to transmit information to the wireless device by being configured to transmit information to the wireless device configuring a plurality of different functions of estimated path loss values; and transmit to the wireless device an indication of one of the plurality of different functions, the indication enabling the wireless device to use the indicated function for determining the transmission power level.

In embodiments, the network node may be further configured to receive the physical uplink channel from the wireless device.

In embodiments, the network node may be further configured to transmit information related to a configuration of multiple transmission points by being configured to transmit at least one of values of parameters of the function of the estimated path loss values; an indication of the signals from the multiple transmission points to use for estimating the path loss value; and configuration information for the multiple transmission points.

In embodiments, the network node may be further configured to transmit the signals by being configured to transmit one of: reference signals; ports of a signal; physical downlink shared channel signals.

In embodiments, the function of the estimated path loss values comprises scaling factors to apply to the respective estimated path loss values, wherein the scaling factors are specific for at least one of: the TRP from which the signal is transmitted; and a type of the transmitted signal.

In embodiments the network node may be further configured to receive a power headroom report from the wireless device determined based on the function of the estimated path loss values.

In embodiments, the physical uplink channel is at least one of: a physical random access channel, a physical uplink shared channel, a physical uplink control channel.

FIG. 6 further illustrates the network node 1260 configured to enable a wireless device 1210 to determine a transmission power level for a physical uplink channel of a wireless communication network, where the network node comprises communication interface circuitry 1290 configured to communicate with the wireless device, and processing circuitry 1270 operably coupled with the communication interface circuitry, whereby the processing circuitry and the communication interface circuitry are configured to perform the operations described with reference to FIG. 5.

In embodiments, a non-transitory, computer-readable medium stores computer-executable instructions that, when executed by processing circuitry 1270 of the network node 1260, configure the network node to perform the operations described with reference to FIG. 5.

Further, in embodiments, a computer program product comprising computer-executable instructions is provided. The instructions, when executed by processing circuitry 1270 of the network node 1260, configure the network node to perform operations corresponding to the ones described with reference to FIG. 5.

Although the subject matter described herein can be implemented in any appropriate type of system using any suitable components, the embodiments disclosed herein are described in relation to a wireless communication network, such as the example wireless communication network illustrated in FIG. 6. For simplicity, the wireless communication network of FIG. 6 only depicts network 1206, network nodes 1260 and 1260b, and wireless devices (WDs) 1210, 1210b, and 1210c. In practice, a wireless communication network can further include any additional elements suitable to support communication between wireless devices or between a wireless device and another communication device, such as a landline telephone, a service provider, or any other network node or end device. Of the illustrated components, network node 1260 and WD 1210 are depicted with additional detail. The wireless communication network can provide communication and other types of services to one or more wireless devices to facilitate the wireless devices' access to and/or use of the services provided by, or via, the wireless communication network.

The wireless communication network can comprise and/or interface with any type of communication, telecommunication, data, cellular, and/or radio network or other similar type of system. In some embodiments, the wireless communication network can be configured to operate according to specific standards or other types of predefined rules or procedures. Thus, particular embodiments of the wireless communication network can implement communication standards, such as Global System for Mobile Communications (GSM), Universal Mobile Telecommunications System (UMTS), Long Term Evolution (LTE), New Radio (NR), evolved NR or 6G, and/or other suitable current or future 3GPP standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless communication networks, metropolitan area networks, and other networks to enable communication between devices.

Network node 1260 and WD 1210 comprise various components described in more detail below. These components work together in order to provide network node and/or wireless device functionality, such as providing wireless connections in a wireless communication network. In different embodiments, the wireless communication network can comprise any number of wired or wireless communication networks, network nodes, base stations, controllers, wireless devices, relay stations, and/or any other components or systems that can facilitate or participate in the communication of data and/or signals whether via wired or wireless connections.

Examples of network nodes include, but are not limited to, TRPs, access points (APs) (e.g., radio access points), base stations (BSs) (e.g., radio base stations, Node Bs, evolved Node Bs (eNodeBs) and NR NodeBs (gNodeBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless communication network or to provide some service to a wireless device that has accessed the wireless communication network.

In FIG. 6, network node 1260 includes processing circuitry 1270, device readable medium 1280, interface circuitry 1290, auxiliary equipment 1284, power source 1286, power circuitry 1287, and antenna 1262. Although network node 1260 illustrated in the example wireless communication network of FIG. 6 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1260 are depicted as single boxes located within a larger box, or nested within multiple boxes, in practice, a network node can comprise multiple different physical components that make up a single illustrated component (e.g., device readable medium 1280 can comprise multiple separate hard drives as well as multiple RAM modules).

Similarly, network node 1260 can be composed of multiple physically separate components (e.g., a NodeB component and a RNC component, or a BTS component and a BSC component, etc.), which can each have their own respective components. In certain scenarios in which network node 1260 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1260 can be configured to support multiple radio access technologies (RATs). In such embodiments, some components can be duplicated (e.g., separate device readable medium 1280 for the different RATs) and some components can be reused (e.g., the same antenna 1262 can be shared by the RATs). Network node 1260 can also include multiple sets of the various illustrated components for different wireless technologies integrated into network node 1260, such as, for example, GSM, WCDMA, LTE, NR, 6G, WiFi, or Bluetooth wireless technologies. These wireless technologies can be integrated into the same or different chip or set of chips and other components within network node 1260.

Processing circuitry 1270 can be configured to perform any determining, calculating, or similar operations (e.g., certain obtaining operations) described herein as being provided by a network node. These operations performed by processing circuitry 1270 can include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1260, either alone or in conjunction with other network node 1260 components (e.g., device readable medium 1280). Such functionality can include any of the various wireless features, functions, or benefits discussed herein.

For example, processing circuitry 1270 can execute instructions stored in device readable medium 1280 or in memory within processing circuitry 1270. In some embodiments, processing circuitry 1270 can include a system on a chip (SOC). As a more specific example, instructions (also referred to as a computer program product) stored in medium 1280 can include instructions that, when executed by processing circuitry 1270, can configure network node 1260 to perform operations corresponding to various exemplary methods (e.g., procedures) described herein.

In some embodiments, processing circuitry 1270 can include one or more of radio frequency (RF) transceiver circuitry 1272 and baseband processing circuitry 1274. In some embodiments, radio frequency (RF) transceiver circuitry 1272 and baseband processing circuitry 1274 can be on separate chips (or sets of chips), boards, or units, such as radio units and digital units. In alternative embodiments, part or all of RF transceiver circuitry 1272 and baseband processing circuitry 1274 can be on the same chip or set of chips, boards, or units In certain embodiments, some or all of the functionality described herein as being provided by a network node, base station, gNodeB or other such network device can be performed by processing circuitry 1270 executing instructions stored on device readable medium 1280 or memory within processing circuitry 1270. In alternative embodiments, some or all of the functionality can be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260 but are enjoyed by network node 1260 as a whole, and/or by end users and the wireless communication network generally.

Device readable medium 1280 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1270. Device readable medium 1280 can store any suitable instructions, data or information, including a computer program, software, an application including one or more of logic, rules, code, tables, etc. and/or other instructions capable of being executed by processing circuitry 1270 and, utilized by network node 1260. Device readable medium 1280 can be used to store any calculations made by processing circuitry 1270 and/or any data received via interface 1290. In some embodiments, processing circuitry 1270 and device readable medium 1280 can be considered to be integrated.

Interface 1290 is used in the wired or wireless communication of signaling and/or data between network node 1260, network 1206, and/or WDs 1210. As illustrated, interface 1290 comprises port(s)/terminal(s) 1294 to send and receive data, for example to and from network 1206 over a wired connection. Interface 1290 also includes radio front end circuitry 1292 that can be coupled to, or in certain embodiments a part of, antenna 1262. Radio front end circuitry 1292 comprises filters 1298 and amplifiers 1296. Radio front end circuitry 1292 can be connected to antenna 1262 and processing circuitry 1270. Radio front end circuitry can be configured to condition signals communicated between antenna 1262 and processing circuitry 1270. Radio front end circuitry 1292 can receive digital data that is to be sent out to other network nodes or WDs via a wireless connection. Radio front end circuitry 1292 can convert the digital data into a radio signal having the appropriate channel and bandwidth parameters using a combination of filters 1298 and/or amplifiers 1296. The radio signal can then be transmitted via antenna 1262. Similarly, when receiving data, antenna 1262 can collect radio signals which are then converted into digital data by radio front end circuitry 1292. The digital data can be passed to processing circuitry 1270. In other embodiments, the interface can comprise different components and/or different combinations of components.

In certain alternative embodiments, network node 1260 may not include separate radio front end circuitry 1292, instead, processing circuitry 1270 can comprise radio front end circuitry and can be connected to antenna 1262 without separate radio front end circuitry 1292. Similarly, in some embodiments, all or some of RF transceiver circuitry 1272 can be considered a part of interface 1290. In still other embodiments, interface 1290 can include one or more ports or terminals 1294, radio front end circuitry 1292, and RF transceiver circuitry 1272, as part of a radio unit (not shown), and interface 1290 can communicate with baseband processing circuitry 1274, which is part of a digital unit (not shown).

Antenna 1262 can include one or more antennas, or antenna arrays, configured to send and/or receive wireless signals. Antenna 1262 can be coupled to radio front end circuitry 1290 and can be any type of antenna capable of transmitting and receiving data and/or signals wirelessly. In some embodiments, antenna 1262 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1262 can be separate from network node 1260 and can be connectable to network node 1260 through an interface or port.

Antenna 1262, interface 1290, and/or processing circuitry 1270 can be configured to perform any receiving operations and/or certain obtaining operations described herein as being performed by a network node. Any information, data and/or signals can be received from a wireless device, another network node and/or any other network equipment. Similarly, antenna 1262, interface 1290, and/or processing circuitry 1270 can be configured to perform any transmitting operations described herein as being performed by a network node. Any information, data and/or signals can be transmitted to a wireless device, another network node and/or any other network equipment.

Power circuitry 1287 can comprise, or be coupled to, power management circuitry and can be configured to supply the components of network node 1260 with power for performing the functionality described herein. Power circuitry 1287 can receive power from power source 1286. Power source 1286 and/or power circuitry 1287 can be configured to provide power to the various components of network node 1260 in a form suitable for the respective components (e.g., at a voltage and current level needed for each respective component). Power source 1286 can either be included in, or external to, power circuitry 1287 and/or network node 1260. For example, network node 1260 can be connectable to an external power source (e.g., an electricity outlet) via an input circuitry or interface such as an electrical cable, whereby the external power source supplies power to power circuitry 1287. As a further example, power source 1286 can comprise a source of power in the form of a battery or battery pack which is connected to, or integrated in, power circuitry 1287. The battery can provide backup power should the external power source fail. Other types of power sources, such as photovoltaic devices, can also be used.

Alternative embodiments of network node 1260 can include additional components beyond those shown in FIG. 6 that can be responsible for providing certain aspects of the network node's functionality, including any of the functionality described herein and/or any functionality necessary to support the subject matter described herein. For example, network node 1260 can include user interface equipment to allow and/or facilitate input of information into network node 1260 and to allow and/or facilitate output of information from network node 1260. This can allow and/or facilitate a user to perform diagnostic, maintenance, repair, and other administrative functions for network node 1260.

In some embodiments, a WD 1210 can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1210 includes antenna 1211, interface circuitry 1214, processing circuitry 1220, device readable medium 1230, user interface equipment 1232, auxiliary equipment 1234, power source 1236 and power circuitry 1237. WD 1210 can include multiple sets of one or more of the illustrated components for different wireless technologies supported by WD 1210, such as, for example, GSM, WCDMA, LTE, NR, WiFi, WiMAX, or Bluetooth wireless technologies, just to mention a few. These wireless technologies can be integrated into the same or different chips or set of chips as other components within WD 1210.

Antenna 1211 can include one or more antennas or antenna arrays, configured to send and/or receive wireless signals, and is connected to interface 1214. In certain alternative embodiments, antenna 1211 can be separate from WD 1210 and be connectable to WD 1210 through an interface or port. Antenna 1211, interface 1214, and/or processing circuitry 1220 can be configured to perform any receiving or transmitting operations described herein as being performed by a WD. Any information, data and/or signals can be received from a network node and/or another WD. In some embodiments, radio front end circuitry and/or antenna 1211 can be considered an interface.

As illustrated, interface 1214 comprises radio front end circuitry 1212 and antenna 1211. Radio front end circuitry 1212 comprise one or more filters 1218 and amplifiers 1216. Radio front end circuitry 1214 is connected to antenna 1211 and processing circuitry 1220 and can be configured to condition signals communicated between antenna 1211 and processing circuitry 1220. Radio front end circuitry 1212 can be coupled to or a part of antenna 1211. In some embodiments, WD 1210 may not include separate radio front end circuitry 1212; rather, processing circuitry 1220 can comprise radio front end circuitry and can be connected to antenna 1211. Similarly, in some embodiments, some or all of RF transceiver circuitry 1222 can be considered a part of interface 1214. Radio front end circuitry 1212 can receive digital data that is to be sent out to other network nodes or WDs via a wireless connection. Radio front end circuitry 1212 can convert the digital data into a radio signal having the appropriate channel and bandwidth parameters using a combination of filters 1218 and/or amplifiers 1216. The radio signal can then be transmitted via antenna 1211. Similarly, when receiving data, antenna 1211 can collect radio signals which are then converted into digital data by radio front end circuitry 1212. The digital data can be passed to processing circuitry 1220. In other embodiments, the interface can comprise different components and/or different combinations of components.

Processing circuitry 1220 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1210 functionality either alone or in combination with other WD 1210 components, such as device readable medium 1230. Such functionality can include any of the various wireless features or benefits discussed herein.

For example, processing circuitry 1220 can execute instructions stored in device readable medium 1230 or in memory within processing circuitry 1220 to provide the functionality disclosed herein. More specifically, instructions (also referred to as a computer program product) stored in medium 1230 can include instructions that, when executed by processor 1220, can configure wireless device 1210 to perform operations corresponding to various exemplary methods (e.g., procedures) described herein.

As illustrated, processing circuitry 1220 includes one or more of RF transceiver circuitry 1222, baseband processing circuitry 1224, and application processing circuitry 1226. In other embodiments, the processing circuitry can comprise different components and/or different combinations of components. In certain embodiments processing circuitry 1220 of WD 1210 can comprise a SOC. In some embodiments, RF transceiver circuitry 1222, baseband processing circuitry 1224, and application processing circuitry 1226 can be on separate chips or sets of chips. In alternative embodiments, part or all of baseband processing circuitry 1224 and application processing circuitry 1226 can be combined into one chip or set of chips, and RF transceiver circuitry 1222 can be on a separate chip or set of chips. In still alternative embodiments, part or all of RF transceiver circuitry 1222 and baseband processing circuitry 1224 can be on the same chip or set of chips, and application processing circuitry 1226 can be on a separate chip or set of chips. In yet other alternative embodiments, part or all of RF transceiver circuitry 1222, baseband processing circuitry 1224, and application processing circuitry 1226 can be combined in the same chip or set of chips. In some embodiments, RF transceiver circuitry 1222 can be a part of interface 1214. RF transceiver circuitry 1222 can condition RF signals for processing circuitry 1220.

In certain embodiments, some or all of the functionality described herein as being performed by a WD can be provided by processing circuitry 1220 executing instructions stored on device readable medium 1230, which in certain embodiments can be a computer-readable storage medium. In alternative embodiments, some or all of the functionality can be provided by processing circuitry 1220 without executing instructions stored on a separate or discrete device readable storage medium, such as in a hard-wired manner. In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless communication network generally.

Processing circuitry 1220 can be configured to perform any determining, calculating, or similar operations (e.g., certain obtaining operations) described herein as being performed by a WD. These operations, as performed by processing circuitry 1220, can include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 can be operable to store a computer program, software, an application including one or more of logic, rules, code, tables, etc. and/or other instructions capable of being executed by processing circuitry 1220. Device readable medium 1230 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1220. In some embodiments, processing circuitry 1220 and device readable medium 1230 can be considered to be integrated.

User interface equipment 1232 can include components that allow and/or facilitate a human user to interact with WD 1210. Such interaction can be of many forms, such as visual, audial, tactile, etc. User interface equipment 1232 can be operable to produce output to the user and to allow and/or facilitate the user to provide input to WD 1210. The type of interaction can vary depending on the type of user interface equipment 1232 installed in WD 1210. For example, if WD 1210 is a smart phone, the interaction can be via a touch screen; if WD 1210 is a smart meter, the interaction can be through a screen that provides usage (e.g., the number of gallons used) or a speaker that provides an audible alert (e.g., if smoke is detected). User interface equipment 1232 can include input interfaces, devices and circuits, and output interfaces, devices and circuits. User interface equipment 1232 can be configured to allow and/or facilitate input of information into WD 1210 and is connected to processing circuitry 1220 to allow and/or facilitate processing circuitry 1220 to process the input information. User interface equipment 1232 can include, for example, a microphone, a proximity or other sensor, keys/buttons, a touch display, one or more cameras, a USB port, or other input circuitry. User interface equipment 1232 is also configured to allow and/or facilitate output of information from WD 1210, and to allow and/or facilitate processing circuitry 1220 to output information from WD 1210. User interface equipment 1232 can include, for example, a speaker, a display, vibrating circuitry, a USB port, a headphone interface, or other output circuitry. Using one or more input and output interfaces, devices, and circuits, of user interface equipment 1232, WD 1210 can communicate with end users and/or the wireless communication network and allow and/or facilitate them to benefit from the functionality described herein.

Auxiliary equipment 1234 is operable to provide more specific functionality which may not be generally performed by WDs. This can comprise specialized sensors for doing measurements for various purposes, interfaces for additional types of communication such as wired communications etc. The inclusion and type of components of auxiliary equipment 1234 can vary depending on the embodiment and/or scenario.

Power source 1236 can, in some embodiments, be in the form of a battery or battery pack. Other types of power sources, such as an external power source (e.g., an electricity outlet), photovoltaic devices or power cells, can also be used. WD 1210 can further comprise power circuitry 1237 for delivering power from power source 1236 to the various parts of WD 1210 which need power from power source 1236 to carry out any functionality described or indicated herein. Power circuitry 1237 can in certain embodiments comprise power management circuitry. Power circuitry 1237 can additionally or alternatively be operable to receive power from an external power source; in which case WD 1210 can be connectable to the external power source (such as an electricity outlet) via input circuitry or an interface such as an electrical power cable. Power circuitry 1237 can also in certain embodiments be operable to deliver power from an external power source to power source 1236. This can be, for example, for the charging of power source 1236. Power circuitry 1237 can perform any converting or other modification to the power from power source 1236 to make it suitable for supply to the respective components of WD 1210.

Figure 7:
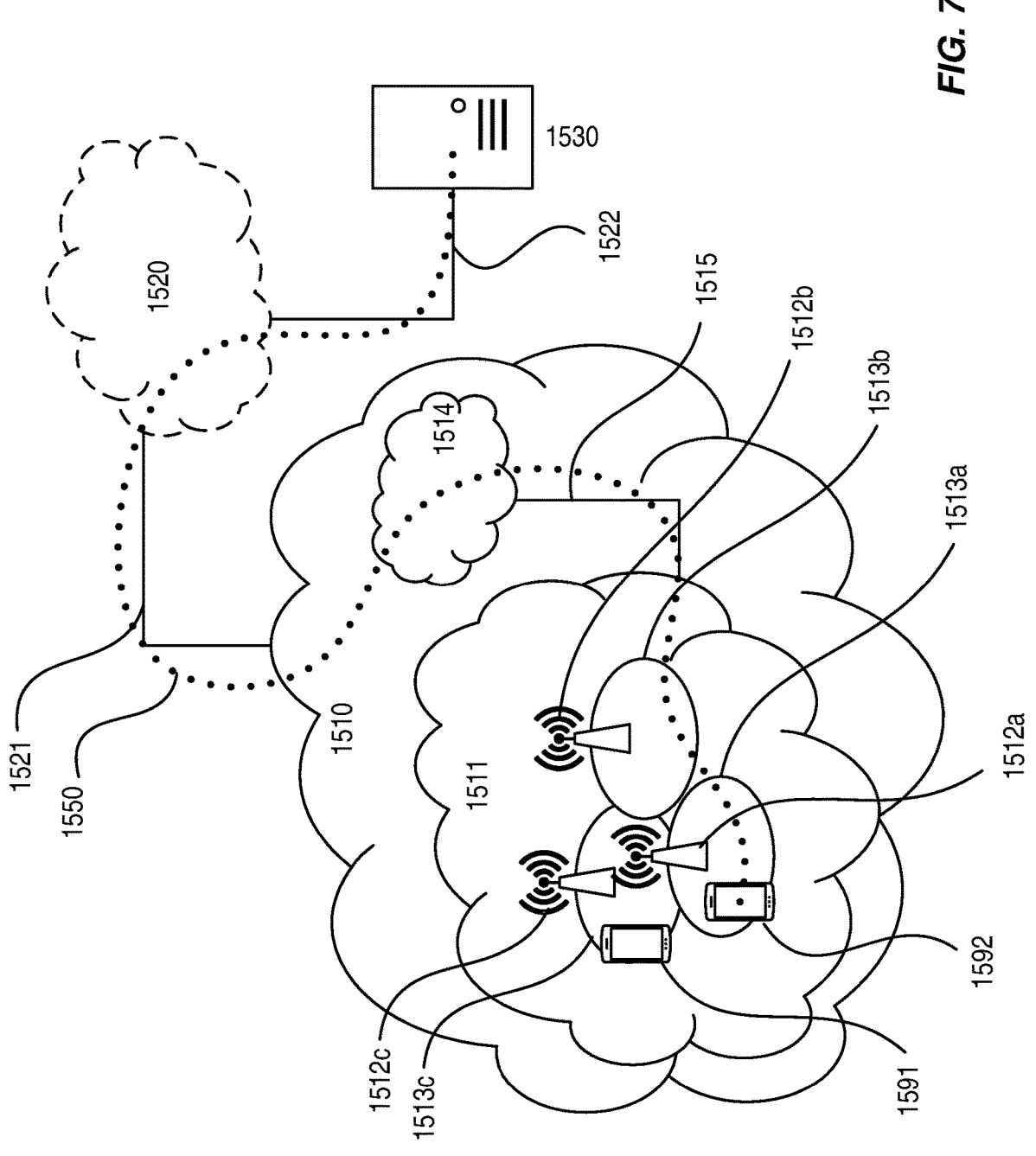
FIGS. 7-8 are block diagrams of exemplary communication systems and/or networks, according to various exemplary embodiments of the present disclosure.

With reference to FIG. 7, in accordance with an embodiment, a communication system includes telecommunication network 1510, such as a 3GPP-type cellular network, which comprises access network 1511, such as a radio access network, and core network 1514. Access network 1511 comprises a plurality of base stations 1512a, 1512b, 1512c, such as NBs, eNodeBs, gNodeBs or other types of wireless access points or TRPs, each defining a corresponding coverage area 1513a, 1513b, 1513c. Each base station 1512a, 1512b, 1512c is connectable to core network 1514 over a wired or wireless connection 1515. A first UE 1591 located in coverage area 1513c can be configured to wirelessly connect to, or be paged by, the corresponding base station 1512c. A second UE 1592 in coverage area 1513a is wirelessly connectable to the corresponding base station 1512a. While a plurality of UEs 1591, 1592 are illustrated in this example, the disclosed embodiments are equally applicable to a situation where a sole UE is in the coverage area.

Telecommunication network 1510 is itself connected to host computer 1530, which can be embodied in the hardware and/or software of a standalone server, a cloud-implemented server, a distributed server or as processing resources in a server farm. Host computer 1530 can be under the ownership or control of a service provider or can be operated by the service provider or on behalf of the service provider. Connections 1521 and 1522 between telecommunication network 1510 and host computer 1530 can extend directly from core network 1514 to host computer 1530 or can go via an optional intermediate network 1520. Intermediate network 1520 can be one of, or a combination of more than one of, a public, private or hosted network; intermediate network 1520, if any, can be a backbone network or the Internet; in particular, intermediate network 1520 can comprise two or more sub-networks (not shown).

The communication system of FIG. 15 as a whole enables connectivity between the connected UEs 1591, 1592 and host computer 1530. The connectivity can be described as an over-the-top (OTT) connection 1550. Host computer 1530 and the connected UEs 1591, 1592 are configured to communicate data and/or signaling via OTT connection 1550, using access network 1511, core network 1514, any intermediate network 1520 and possible further infrastructure (not shown) as intermediaries. OTT connection 1550 can be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Example implementations, in accordance with an embodiment, of the UE, base station and host computer discussed in the preceding paragraphs will now be described with reference to FIG. 8. In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which can have storage and/or processing capabilities. In particular, processing circuitry 1618 can comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 can be operable to provide a service to a remote user, such as UE 1630 connecting via OTT connection 1650 terminating at UE 1630 and host computer 1610. In providing the service to the remote user, host application 1612 can provide user data which is transmitted using OTT connection 1650.

Communication system 1600 can also include base station 1620 provided in a telecommunication system and comprising hardware 1625 enabling it to communicate with host computer 1610 and with UE 1630. Hardware 1625 can include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 16) served by base station 1620. Communication interface 1626 can be configured to facilitate connection 1660 to host computer 1610. Connection 1660 can be direct, or it can pass through a core network (not shown in FIG. 16) of the telecommunication system and/or through one or more intermediate networks outside the telecommunication system. In the embodiment shown, hardware 1625 of base station 1620 can also include processing circuitry 1628, which can comprise one or more programmable processors, application-specific integrated circuits, field programmable gate arrays or combinations of these (not shown) adapted to execute instructions.

Base station 1620 also includes software 1621 stored internally or accessible via an external connection. For example, software 1621 can include program instructions (also referred to as a computer program product) that, when executed by processing circuitry 1628, can configure base station 1620 to perform operations corresponding to various exemplary methods (e.g., procedures) described herein.

Communication system 1600 can also include UE 1630 already referred to, whose hardware 1635 can include radio interface 1637 configured to set up and maintain wireless connection 1670 with a base station serving a coverage area in which UE 1630 is currently located. Hardware 1635 of UE 1630 can also include processing circuitry 1638, which can comprise one or more programmable processors, application-specific integrated circuits, field programmable gate arrays or combinations of these (not shown) adapted to execute instructions.

UE 1630 also includes software 1631, which is stored in or accessible by UE 1630 and executable by processing circuitry 1638. Software 1631 includes client application 1632. Client application 1632 can be operable to provide a service to a human or non-human user via UE 1630, with the support of host computer 1610. In host computer 1610, an executing host application 1612 can communicate with the executing client application 1632 via OTT connection 1650 terminating at UE 1630 and host computer 1610. In providing the service to the user, client application 1632 can receive request data from host application 1612 and provide user data in response to the request data. OTT connection 1650 can transfer both the request data and the user data. Client application 1632 can interact with the user to generate the user data that it provides. Software 1631 can also include program instructions (also referred to as a computer program product) that, when executed by processing circuitry 1638, can configure UE 1630 to perform operations corresponding to various exemplary methods (e.g., procedures) described herein.

Figure 8:
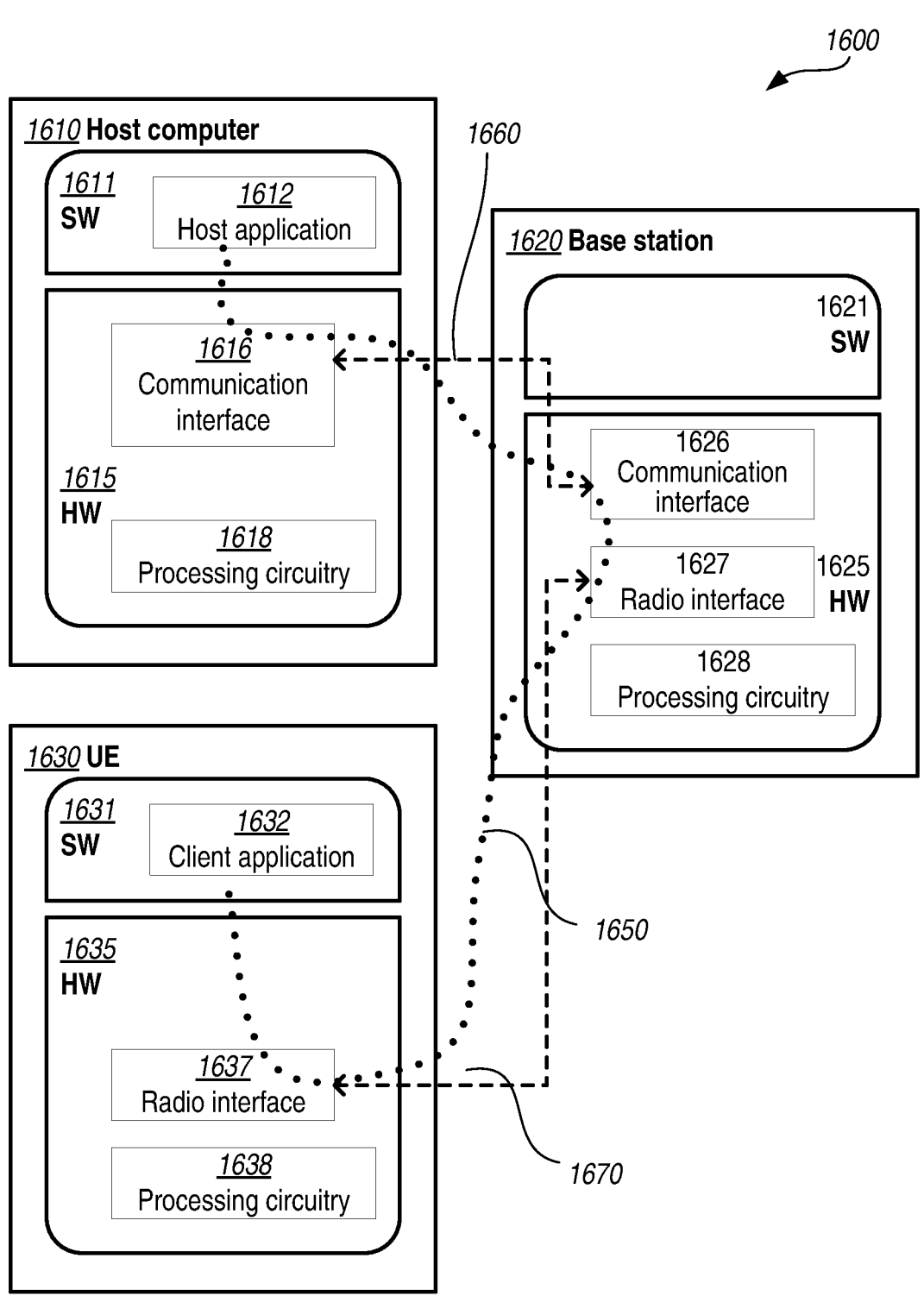

As an example, host computer 1610, base station 1620 and UE 1630 illustrated in FIG. 8 can be similar or identical to host computers or base stations described in relation to other figures herein. For example, the inner workings of these entities can be as shown in FIG. 8 and independently, the surrounding network topology can be that shown in other figures herein.

In FIG. 8, OTT connection 1650 has been drawn abstractly to illustrate the communication between host computer 1610 and UE 1630 via base station 1620, without explicit reference to any intermediary devices and the precise routing of messages via these devices. Network infrastructure can determine the routing, which it can be configured to hide from UE 1630 or from the service provider operating host computer 1610, or both. While OTT connection 1650 is active, the network infrastructure can further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments improve the performance of OTT services provided to UE 1630 using OTT connection 1650, in which wireless connection 1670 forms the last segment. More precisely, the exemplary embodiments disclosed herein can improve reliability, associated with data sessions between a user equipment (UE) and another entity, such as an OTT data application or service external to the 5G network. These and other advantages can facilitate more timely design, implementation, and deployment of D-MIMO solutions. Furthermore, such embodiments can lead to improvements in capacity, throughput, latency, etc. that are envisioned by future generation networks and important for the growth of OTT services.

A measurement procedure can be provided for the purpose of monitoring data rate, latency and other network operational aspects on which the one or more embodiments improve. There can further be an optional network functionality for reconfiguring OTT connection 1650 between host computer 1610 and UE 1630, in response to variations in the measurement results. The measurement procedure and/or the network functionality for reconfiguring OTT connection 1650 can be implemented in software 1611 and hardware 1615 of host computer 1610 or in software 1631 and hardware 1635 of UE 1630, or both. In embodiments, sensors (not shown) can be deployed in or in association with communication devices through which OTT connection 1650 passes; the sensors can participate in the measurement procedure by supplying values of the monitored quantities exemplified above, or supplying values of other physical quantities from which software 1611, 1631 can compute or estimate the monitored quantities. The reconfiguring of OTT connection 1650 can include message format, retransmission settings, preferred routing etc.; the reconfiguring need not affect base station 1620, and it can be unknown or imperceptible to base station 1620. Such procedures and functionalities can be known and practiced in the art. In certain embodiments, measurements can involve proprietary UE signaling facilitating host computer 1610's measurements of throughput, propagation times, latency and the like. The measurements can be implemented in that software 1611 and 1631 causes messages to be transmitted, in particular empty or 'dummy' messages, using OTT connection 1650 while it monitors propagation times, errors, etc.

FIG. 9 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 9 will be included in this section. In step 1710, the host computer provides user data. In substep 1711 (which can be optional) of step 1710, the host computer provides the user data by executing a host application. In step 1720, the host computer initiates a transmission carrying the user data to the UE. In step 1730 (which can be optional), the base station transmits to the UE the user data which was carried in the transmission that the host computer initiated, in accordance with the teachings of the embodiments described throughout this disclosure. In step 1740 (which can also be optional), the UE executes a client application associated with the host application executed by the host computer.

FIG. 10 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 10 will be included in this section. In step 1810 of the method, the host computer provides user data. In an optional substep (not shown) the host computer provides the user data by executing a host application. In step 1820, the host computer initiates a transmission carrying the user data to the UE. The transmission can pass via the base station, in accordance with the teachings of the embodiments described throughout this disclosure. In step 1830 (which can be optional), the UE receives the user data carried in the transmission.

FIG. 11 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 11 will be included in this section. In step 1910 (which can be optional), the UE receives input data provided by the host computer. Additionally or alternatively, in step 1920, the UE provides user data. In substep 1921 (which can be optional) of step 1920, the UE provides the user data by executing a client application. In substep 1911 (which can be optional) of step 1910, the UE executes a client application which provides the user data in reaction to the received input data provided by the host computer. In providing the user data, the executed client application can further consider user input received from the user. Regardless of the specific manner in which the user data was provided, the UE initiates, in substep 1930 (which can be optional), transmission of the user data to the host computer. In step 1940 of the method, the host computer receives the user data transmitted from the UE, in accordance with the teachings of the embodiments described throughout this disclosure.

FIG. 12 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 12 will be included in this section. In step 2010 (which can be optional), in accordance with the teachings of the embodiments described throughout this disclosure, the base station receives user data from the UE. In step 2020 (which can be optional), the base station initiates transmission of the received user data to the host computer. In step 2030 (which can be optional), the host computer receives the user data carried in the transmission initiated by the base station.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

Steps, whether explicitly referred to a such or if implicit, may be re-ordered or omitted if not essential to some of the disclosed embodiments. Like numbers in the drawings refer to like elements throughout.

The terminology used herein is for the purpose of describing particular aspects of the disclosure only, and is not intended to limit the disclosed technology embodiments described herein. As used herein, the singular forms "a", "an" and "the" are intended to include the plural forms as well, unless the context clearly indicates otherwise.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that although some terminology from 3GPP LTE, 5G and 6G standards related technology has been used herein to explain the example embodiments, this should not be seen as limiting the scope of the example embodiments to only these aforementioned communication systems. Other wireless systems may also benefit from the example embodiments disclosed herein.

Also note that terminology such as eNodeB and wireless communications device should be considered as non-limiting and does in particular not imply a certain hierarchical relation between the two. In general "eNodeB" could be considered as device 1 and "wireless communications device" as device 2, and these two devices communicate with each other over some radio channel. Furthermore, while the example embodiments focus on wireless transmissions in the uplink, it should be appreciated that the example embodiments could be applicable in the downlink.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements, features, functions, or steps than those listed and the words "a" or "an" preceding an element do not exclude the presence of a plurality of such elements, features, functions, or steps. It should further be noted that any reference signs do not limit the scope of the claims, that the example embodiments may be implemented at least in part by means of both hardware and software, and that several "means", "units" or "devices" may be represented by the same item of hardware.

A "wireless communications device" as the term may be used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transcribing, such as a personal computer, a home entertainment system, a television, etc. Furthermore, a device may be interpreted as any number of antennas or antenna elements.

Where the description refers to "user equipment" this is to be considered a non-limiting term which means any wireless communications device, terminal, or node capable of receiving in DL and transmitting in UL (e.g. PDA, laptop, mobile, sensor, fixed relay, mobile relay or even a radio base station, e.g. femto base station), which may or may not be always used or useable by a human user, for example UE may be used by a machine user in some embodiments.

A cell is associated with a radio node, where a radio node or radio network node or eNodeB used interchangeably in the example embodiment description, comprises in a general sense any node transmitting radio signals used for measurements, e.g., eNodeB, macro/micro/pico base station, home eNodeB, relay, beacon device, or repeater. A radio node herein may comprise a radio node operating in one or more frequencies or frequency bands. It may be a radio node capable of CA. It may also be a single- or multi-RAT node. A multi-RAT node may comprise a node with co-located RATs or supporting multi-standard radio (MSR) or a mixed radio node.

The various example embodiments described herein are described in the general context of methods, and may refer to elements, functions, steps or processes, one or more or all of which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method performed by a wireless device for determining a transmission power level for a physical uplink channel of a wireless communication network, the method comprising:

receiving information from a network node, the information being related to a configuration of multiple transmission points used for downlink transmissions to the wireless device, receiving the information further comprising receiving information configuring a plurality of different functions of the estimated path loss values;

receiving signals from the multiple transmission points based on the information;

estimating a path loss value for each of at least two transmission points among the multiple transmission points based on the received signals;

selecting one of the plurality of different functions of the estimated path loss values as the function to use for determining a single value based on the received indication of the function of the estimated path loss values to use;

determining the single value based on a function of the estimated path loss values; and determining the transmission power level based on the single value.

2. The method according to claim 1, further comprising:

transmitting on the physical uplink channel using the determined transmission power level.

3. The method according to claim 1, wherein the received information comprises at least one from a group consisting of:

an indication of the function of the estimated path loss values to use for determining the single value;

values of parameters of the function of the estimated path loss values to use for determining the single value;

an indication of the signals from the multiple transmission points to use for estimating the path loss values; and configuration information for the multiple transmission points.

4. The method according to claim 1, wherein receiving the signals comprises receiving one of: reference signals; ports of a signal; and physical downlink shared channel signals.

5. The method according to claim 1, wherein the function of the estimated path loss values to use for determining the single value comprises scaling factors to apply to the respective estimated path loss values, wherein the scaling factors are specific for at least one of: the transmission points from which the signals are received; and a type of the received signals.

6. The method according to claim 1, further comprising adapting the scaling factors based on the estimated path loss values.

7. The method according to claim 1, further comprising:

transmitting a power headroom report, PHR, to the network node, wherein the PHR is determined based on the function of the estimated path loss values.

8. The method according to claim 1, wherein the information is received from a plurality of network nodes, each network node being related to a transmission point of the multiple transmission points.

9. The method according to claim 1, wherein the physical uplink channel is at least one of: a physical random access channel, a physical uplink shared channel, a physical uplink control channel.

10. The method according to claim 1, wherein determining the single value based on the function of the estimated path loss values comprises one of:

determining the single value to be a maximum value of the estimated path loss values;

determining the single value to be a minimum value of the estimated path loss values; and determining the single value based on a function of a sum of the pathloss values.

11. A method performed by a network node for enabling a wireless device to determine a transmission power level for a physical uplink channel of a wireless communication network, the method comprising:

transmitting information to the wireless device, the information being related to a configuration of multiple transmission points used for downlink transmissions to the wireless device, transmitting the information comprising transmitting information to the wireless device configuring a plurality of different functions of estimated path loss values;

transmitting signals from the multiple transmission points based on the information, the transmitted information and signals enabling the wireless device to determine the transmission power level based on a function of estimated path loss values for the multiple transmission points by enabling the wireless device to:

estimate a path loss value for each of at least two transmission points among the multiple transmission points based on received signals;

select one of the plurality of different functions of the estimated path loss values as the function to use for determining a single value based on a received indication of the function of the estimated path loss values to use;

determining the single value based on a function of the estimated path loss values; and determining the transmission power level based on the single value.

12. The method of claim 11, wherein transmitting the information comprises:

transmitting to the wireless device an indication of one of the plurality of different functions, the indication enabling the wireless device to use the indicated function for determining the transmission power level.

13. The method according to claim 11, further comprising:

receiving the physical uplink channel from the wireless device.

14. The method according to claim 11, wherein the transmitted information comprises at least one from a group consisting of:

values of parameters of the function of the estimated path loss values;

an indication of the signals from the multiple transmission points to use for estimating the path loss value; and configuration information for the multiple transmission points.

15. The method according to claim 11, wherein transmitting the signals comprises transmitting one of: reference signals; ports of a signal; physical downlink shared channel signals.

16. The method according to claim 11, wherein the function of the estimated path loss values comprises scaling factors to apply to the respective estimated path loss values, wherein the scaling factors are specific for at least one of: the transmission point (TRP) from which the signal is transmitted; and a type of the transmitted signal.

17. The method according to claim 11, further comprising:

receiving a power headroom report from the wireless device determined based on the function of the estimated path loss values.

18. The method according to claim 11, wherein the physical uplink channel is at least one of: a physical random access channel, a physical uplink shared channel, a physical uplink control channel.

19. A wireless device configured to determine a transmission power level for a physical uplink channel of a wireless communication network, the wireless device comprising communication interface circuitry configured to communicate with a network node, and processing circuitry operably coupled with the communication interface circuitry, the processing circuitry and the communication interface circuitry being configured to:

receive information from the network node, the information being related to a configuration of multiple transmission points used for downlink transmissions to the wireless device, the wireless device further being configured to receive the information by being configured to receive information configuring a plurality of different functions of the estimated path loss values;

receive signals from the multiple transmission points based on the information;

estimate a path loss value for each of at least two transmission points among the multiple transmission points based on the received signals;

select one of the plurality of different functions of the estimated path loss values as the function to use for determining a single value based on the received indication of the function of the estimated path loss value to use;

determine the single value based on a function of the estimated path loss values; and determine the transmission power level based on the single value.

20. A network node configured to enable a wireless device to determine a transmission power level for a physical uplink channel of a wireless communication network, the network node comprising communication interface circuitry configured to communicate with the wireless device, and processing circuitry operably coupled with the communication interface circuitry, the processing circuitry and the communication interface circuitry being configured to:

transmit information to the wireless device, the information being related to a configuration of multiple transmission points used for downlink transmissions to the wireless device, the network node further being configured to transmit information to the wireless device by being configured to transmit information to the wireless device configuring a plurality of different functions of estimated path loss values; and transmit signals from the multiple transmission points based on the information, the transmitted information and signals enabling the wireless device to determine the transmission power level based on a function of estimated path loss values for the multiple transmission points by enabling the wireless device to:

estimate a path loss value for each of at least two transmission points among the multiple transmission points based on received signals;

select one of the plurality of different functions of the estimated path loss values as the function to use for determining a single value based on a received indication of the function of the estimated path loss values to use;

determining the single value based on a function of the estimated path loss values; and determining the transmission power level based on the single value.

* * * * *